US008069190B2

(12) United States Patent
McColl et al.

(10) Patent No.: US 8,069,190 B2
(45) Date of Patent: Nov. 29, 2011

(54) SYSTEM AND METHODOLOGY FOR PARALLEL STREAM PROCESSING

(75) Inventors: William Finlay McColl, Palo Alto, CA (US); Wijnand Johannes Suijlen, Utrecht (NL)

(73) Assignee: Cloudscale, Inc., San Mateo, CA (US)

( * ) Notice: Subject to any disclaimer, the term of this patent is extended or adjusted under 35 U.S.C. 154(b) by 345 days.

(21) Appl. No.: 12/343,215

(22) Filed: Dec. 23, 2008

(65) Prior Publication Data

US 2009/0171999 A1 Jul. 2, 2009

Related U.S. Application Data

(60) Provisional application No. 61/016,914, filed on Dec. 27, 2007.

(51) Int. Cl.
*G06F 7/00* (2006.01)
*G06F 17/30* (2006.01)
*G06F 17/20* (2006.01)

(52) U.S. Cl. ......................... 707/805; 707/810; 715/220

(58) Field of Classification Search .................. 717/119; 707/758, 805, 810; 715/220
See application file for complete search history.

(56) References Cited

U.S. PATENT DOCUMENTS

| | | | | |
|---|---|---|---|---|
| 5,371,675 | A * | 12/1994 | Greif et al. | 715/220 |
| 5,583,868 | A * | 12/1996 | Rashid et al. | 370/394 |
| 6,263,494 | B1 * | 7/2001 | Shindo | 717/168 |
| 6,606,102 | B1 * | 8/2003 | Odom | 715/745 |
| 6,732,354 | B2 * | 5/2004 | Ebeling et al. | 717/119 |
| 6,782,381 | B2 | 8/2004 | Nelson et al. | |
| 6,801,938 | B1 * | 10/2004 | Bookman et al. | 709/224 |
| 7,127,672 | B1 * | 10/2006 | Patterson et al. | 715/220 |
| 7,428,703 | B2 | 9/2008 | Miller et al. | |
| 7,454,696 | B2 | 11/2008 | Kuznetsov et al. | |
| 7,523,457 | B2 | 4/2009 | Bhattacharya et al. | |
| 7,533,401 | B2 | 5/2009 | Mehra | |
| 7,590,972 | B2 * | 9/2009 | Axelrod et al. | 717/117 |
| 7,853,867 | B2 * | 12/2010 | Egilsson | 715/212 |
| 2004/0205082 | A1 | 10/2004 | Fontoura et al. | |
| 2010/0153411 | A1 * | 6/2010 | Toebes et al. | 707/758 |

OTHER PUBLICATIONS

Bai, Y. et al "A Data Stream Language and System Designed for Power and Extensibility" in Proceedings of the 15th ACM Conference on Information and Knowledge Management (Nov. 5-11, 2006).

(Continued)

*Primary Examiner* — Mohammad Ali
*Assistant Examiner* — Bao Tran
(74) *Attorney, Agent, or Firm* — G. Mack Riddle

(57) ABSTRACT

A system and methodology for parallel processing of continuous data streams. In one embodiment, a system for parallel processing of data streams comprises: a converter receiving input streams of data in a plurality of formats and transforming the streams into a standardized data stream format comprising rows and columns in which values in a given column are of a homogeneous type; a storage system that continuously maintains a finite interval of each stream subject to specified space limits for the stream; an interface enabling a user to construct parallel stream programs for processing streams in the standardized data stream format, wherein a parallel stream program comprises a linear sequence of program building blocks for performing operations on a data stream; and a runtime computing system running multiple parallel stream programs continuously on the streams as they flow through the storage system.

13 Claims, 10 Drawing Sheets

PIPELINE DESIGN IN GRAPHICAL USER INTERFACE - 400

OTHER PUBLICATIONS

Cortes, C. et al "Hancock: A language for analyzing transactional data streams" in ACM Transactions on Programming Languages and Systems, vol. 26, No. 2, pp. 301-338 (Mar. 2004).
Demers, A. et al "Cayuga: A General Purpose Event Monitoring System" in Proceedings of the Third Biennial Conference on Innovative Data Systems Research, Asilomar, CA (Jan. 2007).
Halbwachs, N. et al "The synchronous dataflow programming language LUSTRE" in Proceedings of the IEEE, 1991, pp. 1305-1320 (1991).
Massie, M. et al "The ganglia distributed monitoring system: design, implementation, and experience" Parallel Computing 30, pp. 817-840 (2004).
Wu, E. et al "High-Performance Complex Event Processing over Streams" in Proceedings of the ACM SIGMOD Conference, pp. 407-418 (Jun. 2006).
Becket, D. "The Design and Implementation of the Redland RDF Library" in Proceedings of the Tenth International World Wide Web conference, Hong Kong (May 2001).
Becket, D., editor "RDF/XML Syntax Specification (Revised)" World Wide Web Consortium (W3C) Recommendation (Feb. 10, 2004).
Borthakur, D. "The Hadoop Distributed File System: Architecture and Design" The Apache Software Foundation (2007).
Clark, J. and Derose, S., editors "XML Path Language (XPath) Version 1.0" World Wide Web Consortium (W3C) Recommendation (Nov. 16, 1999).
Intel, et al. "IMPI Intelligent Platform Management Interface Specification, Second Generation v2.0" Intel Corporation, Hewlett-Packard Company, NEC Corporation,Dell Computer Corporation (Feb. 12, 2004).
MacDonald, M. "Getting Real-Time Data from the Web in Excel" O'Reilly Windows DevCenter (Feb. 08, 2005).
Nottingham, M. and Sayre R., editors "RFC 4287—The Atom Syndication Format" The Internet Society (Dec. 2005).

* cited by examiner

PIPELINE DESIGN IN GRAPHICAL USER INTERFACE - 400

| AGENT | INPUT STREAM | | | | | | | | |
|---|---|---|---|---|---|---|---|---|---|
| COLUMN | Time | Company | Price | Volume | A | B | C | D | E |
| TYPE | Time | String | Double | Integer | Double | Double | Integer | Boolean | Double |
| OUTPUT | | ✓ | | | | | | | ✓ |
| | ...09.52 | "GOOG" | 287.56 | 200 | 57512.00 | 10876367.44 | 37865 | FALSE | |
| | ...09.52 | "MSFT" | 20.56 | 1200 | 24672.00 | 1856437.62 | 90135 | FALSE | |
| | ...09.53 | "INTC" | 13.45 | 2000 | 26900.00 | 1543724.65 | 114348 | FALSE | |
| | ...09.55 | "YHOO" | 11.88 | 500 | 5940.00 | 335972.54 | 28340 | FALSE | |
| | ...09.57 | "GOOG" | 286.90 | 300 | 86070.00 | 10876367.44 | 37865 | FALSE | |
| | ...09.58 | "MSFT" | 20.78 | 320 | 6649.60 | 1856437.62 | 90135 | FALSE | |
| | ...09.58 | "GOOG" | 286.70 | 50 | 14335.00 | 10876367.44 | 37865 | FALSE | |
| | **...10.01** | **"MSFT"** | **20.82** | **650** | **13533.00** | **6995237.84** | **334640** | **TRUE** | **20.90** |
| | **...10.01** | **"ADBE"** | **21.47** | **850** | **18249.50** | **832481.76** | **38815** | **TRUE** | **21.45** |
| | **...10.03** | **"INTC"** | **13.52** | **825** | **11154.00** | **1872361.76** | **139020** | **TRUE** | **13.47** |
| | **...10.04** | **"GOOG"** | **286.80** | **270** | **77436.00** | **4993761.86** | **17425** | **TRUE** | **286.58** |
| | ...10.06 | "INTC" | 13.50 | 1450 | 19575.00 | 1872361.76 | 139020 | FALSE | |
| | ...10.06 | "MSFT" | 20.68 | 3200 | 66176.00 | 6995237.84 | 334640 | FALSE | |
| | **...10.07** | **"YHOO"** | **11.84** | **260** | **3078.40** | **225139.74** | **18895** | **TRUE** | **11.91** |
| | ...10.09 | "MSFT" | 20.90 | 1200 | 25080.00 | 6995237.84 | 334640 | FALSE | |

ALTERNATIVE ARRANGEMENT OF GRAPICAL USER INTERFACE - 500

501

504

| AGENT | Time | Company | Price | Volume | A | ◀ | ◀ | B | C | D | ▶ | ▶ | ‖ | E |
|---|---|---|---|---|---|---|---|---|---|---|---|---|---|---|
| TYPE | Time | String | Double | Integer | Double | | | Double | Integer | Boolean | | | | Double |
| OUTPUT | | ✓ | | | | | | | | | | | | ✓ |
| SCF | Time | Company | Price | Volume | A | | | B | C | D | | | | VWAP |

FIG. 5

SYSTEM AND METHODOLOGY FOR PARALLEL STREAM PROCESSING

CROSS REFERENCE TO RELATED APPLICATIONS

The present application is related to and claims the benefit of priority of the following commonly-owned, presently-pending provisional application(s): application Ser. No. 61/016,914, filed Dec. 27, 2007, entitled "A System and Method for Parallel Stream Processing", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 31936 Bytes, created: Dec. 20, 2008 8:35:44 AM; Object ID: File No. 1; Object Contents: Source code.

BACKGROUND OF INVENTION

1. Field of the Invention

The present invention relates generally to replication of information in data processing environments and, more particularly, to systems and methodologies for analyzing, filtering, enhancing and processing streams of data.

2. Description of the Background Art

Stream processing is concerned with filtering, enriching and enhancing continuous data streams. In order to detect opportunities and threats as early as possible, stream processing systems often need to analyze complex, fast moving, heterogeneous streams of data in real-time. In many cases, they also need to be able to rapidly process historical streams. For example, the ability to rapidly process and analyze historical streams of data is useful in refining trading strategies in the financial services sector. Stream processing software and systems need to run continuously, providing analytics, statistics, filtering, inference, deduction, connection, pattern matching, tracking and tracing.

Stream processing is complementary to databases, data warehousing, data mining, and search engines. The emphasis in stream processing is on continuous time-based information, on time-critical analysis, and often on situations where most of the data is irrelevant to most people most of the time.

In stream processing, one is often looking to pinpoint a rare and important opportunity or threat, without drowning in the relentless flow of data that is typically received by most users and organizations.

Processing of real-time and historical data streams is a critical component of information technology solutions in many application areas, including the following:

Applications in which continuous live data streams from people, sensors, systems and networks are automatically monitored, filtered, analyzed, enhanced and enriched in real-time.

Systems where continuous analytics on massive volumes of real-time data enable businesses and financial services organizations to intelligently discover and immediately respond to opportunities and threats, manage risk, ensure compliance, and deliver the best possible personalized customer experience at all times.

Solutions wherein continuous inference on semantic graphs allows intelligent real-time discovery of deep and important connections within live data streams.

Applications involving continuous real-time analysis of streams of data from networked wireless sensors, such as those that will enable a new intelligent, secure, optimized and highly energy-efficient infrastructure—a new generation of smart buildings, homes, factories, utilities, energy networks, IT systems, data centers, networks and other equipment, each with always-on energy saving, intrusion prevention, and predictive maintenance capabilities.

Solutions utilizing continuous real-time intelligent tracking and tracing (GPS, RFID) enabling powerful new location-based services to be launched, theft and counterfeiting to be reduced, and transportation and distribution to be optimized.

The following is a list of specific application areas that may involve stream processing, although it is by no means a complete list:

Business (Dynamic Pricing, Mobile Advertising, Customer Experience Management, Supply Chain, Logistics, Marketing Intelligence, Risk Management, Compliance, Counterfeit Prevention).

Web and Telecommunications (Marketplaces, Online Games, Social Networks, Personalized Newsfeeds, Semantic Web, Virtual Worlds, Location-Based Services, Fraud Prevention).

Government (Homeland Security, Intelligence, Defense, Compliance).

Financial Services, Banking and Insurance (Algorithmic Trading, Risk Management, Compliance Tracking, Live Oversight, Fraud Prevention, News Services).

Machine-to-Machine Computing (Sensors, Smart Buildings, Remote Monitoring, Predictive Maintenance, Intrusion Prevention, Location Tracking, RFID, Process Control and Optimization, System and Network Monitoring).

In areas such as financial services and government applications, a number of products have been developed which permit the application of rule-based systems (expert systems) to event streams. U.S. Pat. No. 6,782,381 (Method and apparatus for evaluating queries against received event information, Nelson, Giles John et al.), the description of which is hereby incorporated by reference, describes one such approach to rule-based stream processing. United States Patent Application 2004/0220921 (Time series monitoring system, Billock, Joseph Greg et al.), the description of which is hereby incorporated by reference, describes another rule-based approach to event processing. The various rule-based event processing products aim to provide complete applications for complex event processing by coordinating analysis across multiple simultaneous event streams, external databases and spreadsheets, by merging streams, triggering the addition of new compound events and so on. The general technical approach involves using open-ended rule-based expert systems that check against patterns for matches and applying logic such as "when pattern matches, do_action_a, do_action_b, etc.". However, these rule-based expert systems have a number of limitations in processing of data streams. For example, with such systems it can be complex to express even rather simple stream processing applications where the aim is to filter and enrich a stream by partitioning it into a large number of substreams, computing substream properties across various time-based windows, then interleaving the resulting substreams to produce a filtered and enriched output stream. For applications of this kind, it would be desirable to have a solution providing the functionality and structuring of a carefully designed domain-specific programming language, rather than an open-ended rule-based system. Another limitation of rule-based expert systems concerns parallelization. Handling large-scale stream processing applications requires the ability to easily and automatically parallelize stream processing algorithms and programs. In contrast to domain-specific programming languages, rule-based expert systems do not provide a framework in which automatic and efficient parallelization for large-scale implementation can be easily achieved.

In recent years, a number of database research teams in universities have been adapting database techniques in general, and the SQL query language in particular, in order to perform certain types of stream processing (e.g., merge, join, sort, select) across multiple streams of structured data. For a recent example, see, e.g., Yijian Bai et al. "A Data Stream Language and System Designed for Power and Flexibility" in Proceedings of the 15th ACM Conference on Information and Knowledge Management (November 2006), the disclosure of which is hereby incorporated by reference. Several of these research projects have led to commercial products. However, these commercial solutions rely on the use of a database query language (e.g., SQL), and provide for adapting the database query language for use in stream processing. This results in some tradeoffs and inefficiencies in the use of a language that was designed for a different purpose than stream processing.

Keyword-based publish-subscribe systems have also been used for many years to disseminate real-time news to users based on preset subscriptions. Recently, various academic projects have worked to extend the traditional publish-subscribe model in various ways, to give it more expressive power. For example, the Cayuga project combines publish-subscribe automata with a SQL style query language for stream processing on multiple streams (for further description of Cayuga, see e.g., Alan Demers et al. "Cayuga: A General Purpose Event Monitoring System" in Proceedings of the Third Biennial Conference on Innovative Data Systems Research, Asilomar, Calif. (January 2007), the disclosure of which is hereby incorporated by reference). In a similar manner, the SASE project combines database techniques and a rule-based approach to produce an event processing architecture (for further description of the SASE project, see e.g., Eugene Wu et al. "High-Performance Complex Event Processing over Streams", in Proceedings of the ACM SIGMOD Conference, pages 407-418 (June 2006), the disclosure of which is hereby incorporated by reference).

Since the 1970s, general-purpose dataflow programming languages have been used for stream processing of various kinds. Moreover, some dataflow languages are currently being used for certain kinds of real-time stream processing applications. For example, the real-time dataflow language Lustre (the kernel language of the SCADE (formerly SAO+/SAGA) industrial environment) from Esterel Technologies can be used for critical control software in aircraft, helicopters, and nuclear power plants (for further description of Lustre, see e.g., N. Halbwachs et al "The synchronous dataflow programming language Lustre", in Proceedings of the IEEE, 1991, pages 1305-1320 (1991), the disclosure of which is hereby incorporated by reference). To achieve the strict real-time requirements of such applications, the design of Lustre programs can be quite complex, involving detailed analysis of clock synchronization amongst multiple streams.

Batch stream processing architectures such as Hancock have been developed to provide offline (non-real-time) processing of huge repositories of historical stream data, such as phone call records (for further description of Hancock see, e.g., Corinna Cortes et al. "Hancock: A Language for Analyzing Transactional Data Streams" in ACM Transactions on Programming Languages and Systems, Vol. 26, No. 2, pages 301-338 (March 2004), 1-338, the disclosure of which is hereby incorporated by reference).

IBM's System S Research Project is developing a prototype aimed at providing the "middleware" required to coordinate a wide range of distributed stream processing applications. The System S research project aims to produce a stream processing framework that is general-purpose. System S assumes that there are many user-developed stream processing components in use across the Internet, and that the main goal of the System S Stream Processing Core is to provide middleware coordination software that can tie these numerous components together in useful ways. However, System S does not provide a system and method that can be used to build a scalable stream processing architecture.

GigaSpaces of New York, N.Y. offer a product allowing users to offload data from Microsoft Excel to the GigaSpaces in-memory data grid, in order to be able handle larger amounts of data within Excel spreadsheets. They also provide a means of offloading parts of an Excel spreadsheet calculation to an external grid of servers, increasing the computation power available to perform standard spreadsheet calculations. While useful in terms of increasing the computation power and storage available for spreadsheet computations, these products do not offer any capability to perform real-time stream processing on data streams. The Excel spreadsheet model does not provide that capability, nor does the GigaSpaces parallel implementation of Excel.

Mashup editors, such as Yahoo Pipes allow users to combine web data from various sources using sorting, filtering and translation modules, in a way that is similar to the way in which Unix pipes are used to connect primitive Unix library functions. Yahoo Pipes is a web application (available from Yahoo!, Inc. of Sunnyvale, Calif.) that provides a composition tool to aggregate, manipulate, and mashup content by letting users "pipe" information from different sources (e.g., web feeds, web pages, and other services) and set up rules for how that content should be manipulated (e.g. filtering). Like Unix pipes, Yahoo Pipes permits simple commands can be combined together to create output meeting user needs. However, mashup editors such as Yahoo Pipes are not well suited for stream processing, in that they do not handle continuous data streams. The Yahoo Pipes user interface is typical of most visual programming tools, in that much of the complexity of the interface stems from the need to show the often complex mesh of wires connecting the building blocks. This visual complexity presents a major obstacle to the scalability of the approach for complex applications. It would be preferable to have a solution that was "wire-less", offering a powerful and highly scalable interface for complex stream processing applications.

Many modern software systems require mechanisms for the transformation and querying of XML streams. In recent years, a large number of software tools have been developed for the processing of XML streams, based on languages such as XPath, XSLT and XQuery. United States Patent Application 2004/0205082 (System and method for Querying XML streams, Fontoura, Marcus et al.) describes one such approach to XML processing. Open source software tools such as the SAXON XSLT processor (authored by Michael Kay and available from Saxonia.com of Reading, United Kingdom) provide extensive support for handling XML data. However, they do not provide a general-purpose solution for handling data that is not in XML format.

What is needed is a solution that is specifically designed for general-purpose stream processing. The solution should have the ability to handle all kinds of streaming data, including tables, text, feeds and graphs. Ideally, the solution should facilitate real-time processing applications requiring complex combinations of analysis, statistical monitoring, filtering, tracking and tracing, inference, deduction and pattern matching. The present invention provides a solution for these and other needs.

SUMMARY OF INVENTION

The present invention comprises a scalable, general-purpose system and method for continuous processing of data streams by multiple programs. The invention can be used to solve a wide range of challenging real-time stream processing problems on heterogeneous data streams containing a mixture of structured, semi-structured, and unstructured data. The invention can also be used to process historical data streams.

Real-time stream processing applications in business, government and on the web may require complex combinations of analysis, statistical monitoring, filtering, tracking and tracing, inference, deduction and pattern matching. The present invention allows such applications to process more data, more forms of data, and to provide more complex forms of processing. Additionally, the present invention permits parallel processing to be used at multiple levels in an application to achieve the highest levels of performance and scalability.

In one embodiment, for example, a system of the present invention for parallel processing of data streams is described that comprises: a converter that receives input streams of data in a plurality of formats and transforms the streams into a standardized data stream format comprising rows and columns in which values in a given column are of a homogeneous type; a storage system that continuously maintains a finite interval of each stream in the standardized data stream format subject to specified space limits for the stream; an interface enabling a user to construct parallel stream programs for processing streams in the standardized data stream format, wherein a parallel stream program comprises a linear sequence of program building blocks for performing operations on a data stream; and a runtime computing system running multiple parallel stream programs continuously on the streams in the standardized data stream format as they flow through the storage system.

BRIEF DESCRIPTION OF DRAWINGS

FIG. 4 is an illustration of a graphical user interface of the present invention with example "livesheet" data.

FIG. 5 is an illustration of an alternative embodiment of the graphical user interface.

DETAILED DESCRIPTION

Glossary

Figure 1:
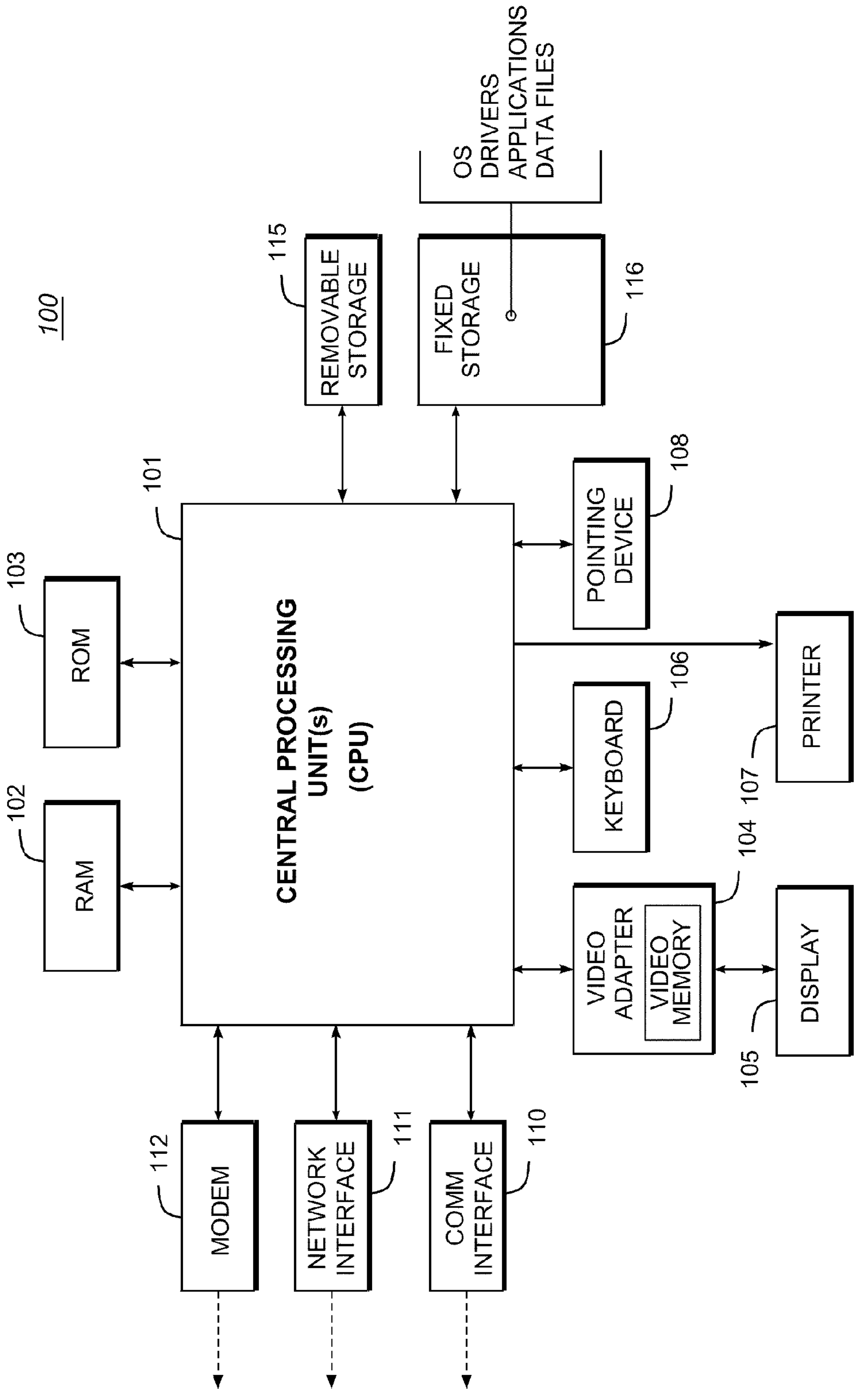
FIG. 1 is a general block diagram of a computer system (e.g., an IBM-compatible system) in which software-implemented processes of the present invention may be embodied.

The following definitions are offered for purposes of illustration, not limitation, in order to assist with understanding the discussion that follows.

Atom: Atom refers to the Atom Syndication Format, an XML language used for web feeds, such as a list (or "feed") of recent articles or content in a standardized, machine-readable format. The Atom format was developed as an alternative to RSS and is published as an Internet Engineering Task Force (IETF) proposed standard as RFC 4287, the disclosure of which is hereby incorporated by reference. A copy of this specification is currently available from the IETF (IETF.org) via the Internet.

ColumnFlow: ColumnFlow refers to the domain-specific parallel processing model of the present invention for processing continuous data streams. In the ColumnFlow model of the present invention, a parallel program comprises a linear pipeline of Assignment, Selection, Parallel and Window building blocks as described in further detail in this document.

HTML: HTML stands for HyperText Markup Language, the authoring language used to create documents on the World Wide Web. HTML defines the structure and layout of a Web document by using a variety of tags and attributes. For further description of HTML, see e.g., "HTML 4.01 Specification", a World Wide Web consortium (W3C) recommendation dated Dec. 24, 1999, the disclosure of which is hereby incorporated by reference. A copy of this specification is currently available from the W3C (w3.org) via the Internet.

JSON: JSON (JavaScript Object Notation) is a lightweight data-interchange format. It is based on a subset of the JavaScript Programming Language, Standard ECMA-262 3rd Edition—December 1999. JSON is a text format that is language independent but uses conventions that are familiar to programmers of the C-family of languages, including C, C++, C#, Java, JavaScript, Perl, Python, and many others. These properties make JSON a useful data-interchange language. For further description of JSON, see, e.g., RFC 4627 published as an Internet proposed standard by the Internet Engineering Task Force (IETF), the disclosure of which is hereby incorporated by reference. A copy of RFC 4627 is currently available from the IETF (IETF.org) via the Internet.

Livesheet: In Microsoft Excel and other spreadsheet programs, users define and perform their calculations and processing within various worksheets. Each worksheet consists of a two-dimensional array of cells, arranged in rows and columns. When integrated into Excel or another spreadsheet such as OpenOffice Calc, the present invention enables users to define and perform real-time stream calculations and processing within one or more livesheets. Like a worksheet, a livesheet consists of cells arranged in rows and columns. There are, however, fundamental differences between livesheets of the present invention and conventional worksheets or spreadsheets. Firstly, the number of rows in a livesheet is potentially infinite, as the livesheet represents a continuously flowing data stream. Additionally, the data within a particular column of a livesheet represents time-varying values of that particular column of the stream. For example, the column might represent Price information, in which case the sequence of rows in that column represents time-varying Price information in the stream. In contrast, in a spreadsheet the contents of a single column within a worksheet do not have the same uniformity or restrictions. In a worksheet, a single column might, for example, contain some price information rows, some location information rows in other places, some color rows, some statistical average rows and so on and so forth.

Lucene: Lucene is an information retrieval library that provides full text indexing and searching. Once a Lucene index has been created for some text, a wide variety of Lucene queries can then be efficiently run against that index. For further description of Lucene indexes and searching software, see, e.g., Otis Gospodnetic and Erik Hatcher "Lucene in Action", Manning Publications (2005), the disclosure of which is hereby incorporated by reference.

RDF: RDF refers to the Resource Description Framework, a family of World Wide Web Consortium (W3C) specifications, originally designed as a metadata data model, which has come to be used as a general method of modeling information through a variety of syntax formats. The RDF data model is based upon the idea of making statements about Web resources in the form of subject-predicate-object expressions, called triples in RDF terminology. The subject denotes the resource, and the predicate denotes traits or aspects of the resource and expresses a relationship between the subject and the object. For example, one way to represent the notion "The sky has the color blue" in RDF is as the triple: a subject denoting "the sky", a predicate denoting "has the color", and an object denoting "blue". RDF is an abstract model with several serialization formats (i.e., file formats), and the particular way in which a resource or triple is encoded varies from format to format.

RDF/XML is an XML serialization format. For further description of RDF/XML, see e.g., "RDF/XML Syntax Specification (Revised)", a World Wide Web consortium (W3C) recommendation dated Feb. 10, 2004, the disclosure of which is hereby incorporated by reference. A copy of this specification is currently available from the W3C (w3.org) via the Internet.

RSS: RSS is an acronym for Really Simple Syndication, a Web content syndication format. RSS is a dialect of XML and RSS files must conform to the XML 1.0 specification, as published on the World Wide Web Consortium (W3C) website. RSS is used to publish frequently updated works such as blog entries, news headlines, audio, and video in a standardized format. An RSS document (which is typically called a "feed", "web feed", or "channel") includes full or summarized text, plus metadata such as publishing dates and authorship. For further description of RSS, see e.g., "RSS 2.0 Specification (version 2.0.10)", published by the RSS Advisory Board on Oct. 17, 2007, the disclosure of which is hereby incorporated by reference. A copy of this specification is currently available from the RSS Advisory Board (rssboard.org) via the Internet.

SCF: SCF stands for the Simple Column Format of the present invention which provides a unified data format for heterogeneous data streams as described in further detail in this document. In its presently preferred embodiment, the Simple Column Format comprises a two-dimensional cell-based data format for heterogeneous streams, with each SCF stream comprising rows and columns. The values in a given SCF column are of a homogeneous type (e.g., all strings or all integers). Additionally, each SCF row has a time stamp in the currently preferred embodiment and such time stamps are non-decreasing through the rows of a stream.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999.

XML: XML stands for Extensible Markup Language, a specification developed by the World Wide Web Consortium (W3C). XML is a pared-down version of the Standard Generalized Markup Language (SGML), a system for organizing and tagging elements of a document. XML is designed especially for Web documents. It allows designers to create their own customized tags, enabling the definition, transmission, validation, and interpretation of data between applications and between organizations. For further description of XML, see e.g., "Extensible Markup Language (XML) 1.0", (5th Edition, Nov. 26, 2008) a recommended specification from the W3C, the disclosure of which is hereby incorporated by reference. A copy of this specification is currently available from the W3C (w3.org) via the Internet.

XPath: XPath is a query language for querying data in XML documents. The XPath query language is commonly used in Extensible Stylesheet Language Transformations (XSLT) to locate and to apply XSLT templates to specific nodes in a XML document. XPath queries are also commonly used to locate and to process nodes in a XML document that match a specified criteria. XPath provides basic facilities for manipulation of strings, numbers, and Booleans. It uses a compact, non-XML syntax to facilitate use of XPath within URIs and XML attribute values. XPath operates on the abstract, logical structure of a XML document, rather than its surface syntax. XPath gets its name from its use of a path notation as in URLs for navigating through the hierarchical structure of a XML document. For further description of XPath, see e.g., "XML Path Language (XPath) Version 1.0" (Nov. 16, 1999), a recommended specification from the W3C, the disclosure of which is hereby incorporated by reference. A copy of this specification is available from the W3C (w3.org) via the Internet.

XQuery: XQuery is a query language (with some programming language features) that is designed to query collections of XML data. It is semantically similar to SQL and was developed by the XML Query working group of the W3C.

XPath 2.0 is a subset of XQuery 1.0. XQuery 1.0 became a W3C Recommendation on Jan. 23, 2007. A copy of the XQuery specification is available from the W3C (w3.org) via the Internet.

XSL: XSL is a family of recommended standards for defining XML document transformation and presentation including XSLT (below), the XML Path Language (XPath) which is an expression language used by XSLT to access or refer to parts of an XML document, and XSL Formatting Objects (XSL-FO), an XML vocabulary for specifying formatting semantics.

XSLT: XSLT stands for XSL Transformations, a language for transforming XML documents into other XML documents. For further description of XSLT, see e.g., "XSL Transformations (XSLT) Version 1.0" (Nov. 16, 1999), a recommended specification from the W3C, the disclosure of which is hereby incorporated by reference. A copy of the XSLT specification is currently available from the W3C (w3.org) via the Internet.

INTRODUCTION

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Linux operating system. The present invention, however, is not limited to any one particular application or any particular environment. Instead, those skilled in the art will find that the system and methods of the present invention may be advantageously embodied on a variety of different platforms, including Macintosh, Microsoft Windows, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bidirectional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Red Hat Linux (Red Hat, Inc. of Raleigh, N.C.), Suse Linux (Novell of Waltham, Mass.), Microsoft Windows NT, Microsoft Windows 2000, Microsoft Windows XP, or Microsoft Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

The above-described computer hardware and software are presented for purposes of illustrating the basic underlying computer components that may be employed for implementing the present invention. For purposes of discussion, the following description will present examples in which it will be assumed that there exists a conventional, general-purpose computer system or server such as the system illustrated in FIG. 1 or a group of such systems that communicate with one via a network. Typically, each computer system will have some number of microprocessors, and each of those microprocessors will have some number of processor cores. For example, a system might have eight microprocessors, each with four processor cores, giving a total of thirty-two cores for the system. The present invention places no restrictions on the number and configuration of processors that may be utilized. Additionally, there is no requirement that the number of cores in each microprocessor be the same, there is no limit on the number of microprocessors within a system, and there is no limit on the number of cores in any one processor. In the simplest case, the system will have one microprocessor with one core. Examples of conventional multi-core microprocessors that may be used are those available from Intel Corporation of Santa Clara, Calif., Advanced Micro Devices Corporation of Sunnyvale, Calif. or Sun Microsystems of Mountain View, Calif. However, any other suitable processor may be utilized for implementing the present invention. Random-access memory serves as the working memory for the processor cores. Mass storage devices provide persistent storage on fixed and removable media, such as magnetic, optical or magnetic-optical storage systems, flash memory, or any other available mass storage technology. The mass storage may be shared on a network, or it may be a dedicated mass storage. The system itself communicates with other devices (e.g., other computers) via a conventional network interface card connected to a network. The present invention places no restrictions on the amount of memory or mass storage required in the hardware system, or on the forms of networking to be used.

General-purpose computer systems of the kind described are available from many vendors. Representative vendors include Dell Computers of Round Rock, Tex., Hewlett-Packard of Palo Alto, Calif., IBM of Armonk, N.Y., Sun Microsystems of Mountain View, Calif., and Apple of Cupertino, Calif. One specific example of such a general-purpose system available in 2007 is the Dell PowerEdge 2950 which can be configured with two quad-core Intel Xeon microprocessors (total 8 cores), 32 gigabytes of memory, and six terabytes of mass storage. The present invention, however, is not limited to any particular environment or device configuration. In particular, a server-based distinction is not necessary to the invention, but is used to provide a framework for discussion. Instead, the present invention may be implemented in any type of system architecture or processing environment capable of supporting the methodologies of the present invention presented in detail below.

Overview of System and Methodology for Parallel Stream Processing

Unified Data Format and Parallel System for Processing Continuous Data Streams

The present invention provides a unified data format for heterogeneous data streams as well as a domain-specific parallel programming model for processing continuous data streams in that format. Both are designed to be as simple-to-use as a spreadsheet, to be as efficient as possible for scalable stream processing, and to permit live data streams to be processed in real-time by systems constructed in accordance with the present invention. The following describes the unified data format for heterogeneous data streams as well as several other features of the currently preferred embodiment of the parallel stream processing system of the present invention.

Stream Format

The present invention provides a unified data format for heterogeneous data stream processing which deals with both finite streams and continuous infinite streams. The present invention, in its presently preferred embodiment, provides a simple two-dimensional cell-based data format for heterogeneous streams. In the following discussion this format is referred to as Simple Column Format (SCF). As in a spreadsheet, each SCF stream consists of rows and columns. Only simple finite structures such as, for example, integers, reals and strings, are permitted within a cell. The values in a given SCF column are of a homogeneous type (e.g., all strings or all integers). Each SCF row has a time stamp, and time stamps are non-decreasing through the rows of a stream.

Table 1 (below) illustrates a sample data stream in SCF format, displaying the header information, column names, column types, and the three rows of the stream.

TABLE 1

1: [
2: {title: "Computing at Scale", subtitle: "New directions in massively parallel processing for business and the web", updated: 2007-03-06T08:03:47Z, updated_parsed: (2007, 3, 6, 8, 3, 47, 1, 65, 0), generator: http://wordpress.org/?v=2.1, language: en, link: http://www.computingatscale.com}

TABLE 1-continued

```
3:
4: [time,title,author,summary,content.type,content,updated_parsed,id,
tags, comments]
5:
6: [time,string, vector(string,1),string, string,string,vector(int,
9),string,string,string]
7:
8: [2007-04-09T18:23:36Z,"Five Generations of The Web",
("Bill McColl"), "As compute power, storage and bandwidth
continue to grow exponentially, the web is ...",
9: "text/html", "<p>As compute power, storage and bandwidth continue
to grow exponentially, the web is evolving through a series of
generations in which ever more powerful tools for the organization,
manipulation .... techniques to recommend
information.</p>\n<blockquote></blockquote>", (2007, 3, 5, 15, 55,
28, 0, 64, 0), "http://www.computingatscale.com/?p=38",
"'Intelligence'
'Applications'","http://www.computingatscale.com/?p=38#comments" ]
10:
11: [2007-04-09T18:23:38Z,"The Cybercrime Data Deluge", ("Bill
McColl"),"Last week at the Black Hat meeting, Jim Christy, a director
of the US Department of Defense Cyber Crime ...","text/html"."<p>Last
week at the <a
href="http://www.blackhat.com/html/bh-dc-07/bh-dc-07-index.
html">Black Hat</a> meeting, Jim Christy, a director of the US
Department of Defense Cyber Crime Center, said that the <a
href="http://news.com.com/2100-7348_3-6162882.html">cybercops are
drowning in data</a> and that they desperately needed powerful new
tools and technologies to help them sift through massive amounts of
information in a forensic manner. Dealing with web crime is now a
major challenge ... step up to this challenge.</p>",(2007, 3, 4, 19,
55, 3, 6, 63,
0),"http://www.computingatscale.com/?p=37","'Intelligence'
'Applications'","http://www.computingatscale.com/?feed=rss2&p=37"]
12:
13: [2007-04-09T18:23:38Z,"Scalable Real-Time Marketplaces",("Bill
McColl"),"New global person-to-person marketplaces for goods,
services, skills and intellectual ...","text/html","<p>New global
person-to-person marketplaces for goods, services, skills and
intellectual property are proliferating across the internet. Early
examples of internet marketplace services such as eBay, Craigslist,
... the future for both the marketplace companies and their
technology suppliers looks very bright.</p>",(2007, 3, 4, 18, 21, 6,
6, 63, 0),"http://www.computingatscale.com/?p=36","'Intelligence'
'Applications'","http://www.computingatscale.com/?p=36#comments"]
14: ]
15:
```

The present invention comprises a system and methodology for the conversion of all kinds of streaming data—tables, text, feeds, graphs—into the unified SCF form, and for indexing columns in order to support complex pattern matching and scoring. The following description explains how data in these four general forms is extracted and converted to SCF. In each case, some or all of the resulting columns can also have a Lucene index built to support scoring as described later in this document.

Tables

Many software solutions such as databases and spreadsheets produce tables of structured data in standardized formats such as CSV (comma-separated values). The following illustrates a high-level approach used in the currently preferred embodiment of the present invention for converting table data streams such as comma-separated values (CSV) into SCF. Using a simple GUI form a user can specify the required translation as follows:

1. Column separator (e.g., comma character).
2. First row of table contains column names? (true/false).
3. Column names for the SCF stream.
4. Escape character (e.g. backslash character).
5. Opening and closing characters around fields that contain either the Column Separator or a line break (e.g. pair of double-quotes " ").
6. Double-double-quote escaping with double-quote enclosed fields? (true/false).
7. Replace line break in field with space? (true/false).
8. Trim leading and trailing spaces on tabs in fields? (true/false).

Text

Other systems produce streams of unstructured text. Examples include audio transcripts, email systems, web pages, Wikipedia pages and so forth. The following illustrates a high-level approach of the presently preferred embodiment for converting text streams (e.g., Wikipedia page streams) into SCF. Using a simple GUI form, the user specifies the required translation as follows:

1. Header separator string (e.g., "").
2. Keep header separator string as end? (true/false).
3. Keep header separator string as start? (true/false).
4. Row separator string, (e.g. "").
5. Keep row separator string as end? (true/false).
6. Keep row separator string as start? (true/false).

Feeds

News feeds are another major form of streaming data. News feeds are typically in a format such as RSS or XML. The following illustrates a high-level method of the present invention for converting news feed data streams (e.g., RSS, Atom, XML) into SCF. Using a simple GUI form, the user specifies the required translation as follows:

1. Repetitive element for stream structuring (e.g., /root/rss/channel/item in an RSS feed).
2. XPath queries identifying the columns to be extracted for the SCF stream, e.g., /root/rss/channel/item/weblog:title 2a. An alternative, more basic method than step 2 for RSS and Atom feeds, is to use a standard feed parser to extract all of the possible column elements, present them in a series of GUI tables, and allow the user to choose from the elements found. This method requires no knowledge of XPath, but will generally produce a large number of elements for the user to select from.

In its presently preferred embodiment, the present invention supports both approaches (2, 2a) for news feed extraction and translation to SCF.

Graphs

Finally, streaming semantic web data is frequently represented as graph or network structures in the form of RDF/XML (Resource Description Framework/XML). The following method can be used to convert graph data streams such as RDF/XML into SCF:

1. Using standard tools such as the Redland RDF Libraries, a set of free software C libraries (available from Dave Becket (librdf.org) of Bristol, United Kingdom) that provide support for the Resource Description Framework (RDF), Applicant's solution automatically translates RDF/XML into a three-column table of RDF triples (e.g., LeftNode, Label, RightNode). For further description of the Redland RDF libraries, see e.g., David Becket "The Design and Implementation of the Redland RDF Library" in Proceedings of the Tenth International World Wide Web conference, Hong Kong, May, 2001, the disclosure of which is hereby incorporated by reference.

2. Using a simple GUI form, the user specifies names for the three columns (e.g., Sender, Length, Receiver).

Parallel Programming Model

The present invention further comprises a domain-specific parallel programming model for processing continuous data streams. The model enables live data streams to be processed in real-time. With this model, there are opportunities for parallel processing at up to eight distinct levels: algorithmic parallelism, column parallelism, pipeline parallelism, parallel-merge parallelism, window parallelism, parametric parallelism, intraflow parallelism and interflow parallelism. In the following discussion, this domain-specific parallel processing model for processing continuous data streams is referred to as the "ColumnFlow" model.

Figure 2:
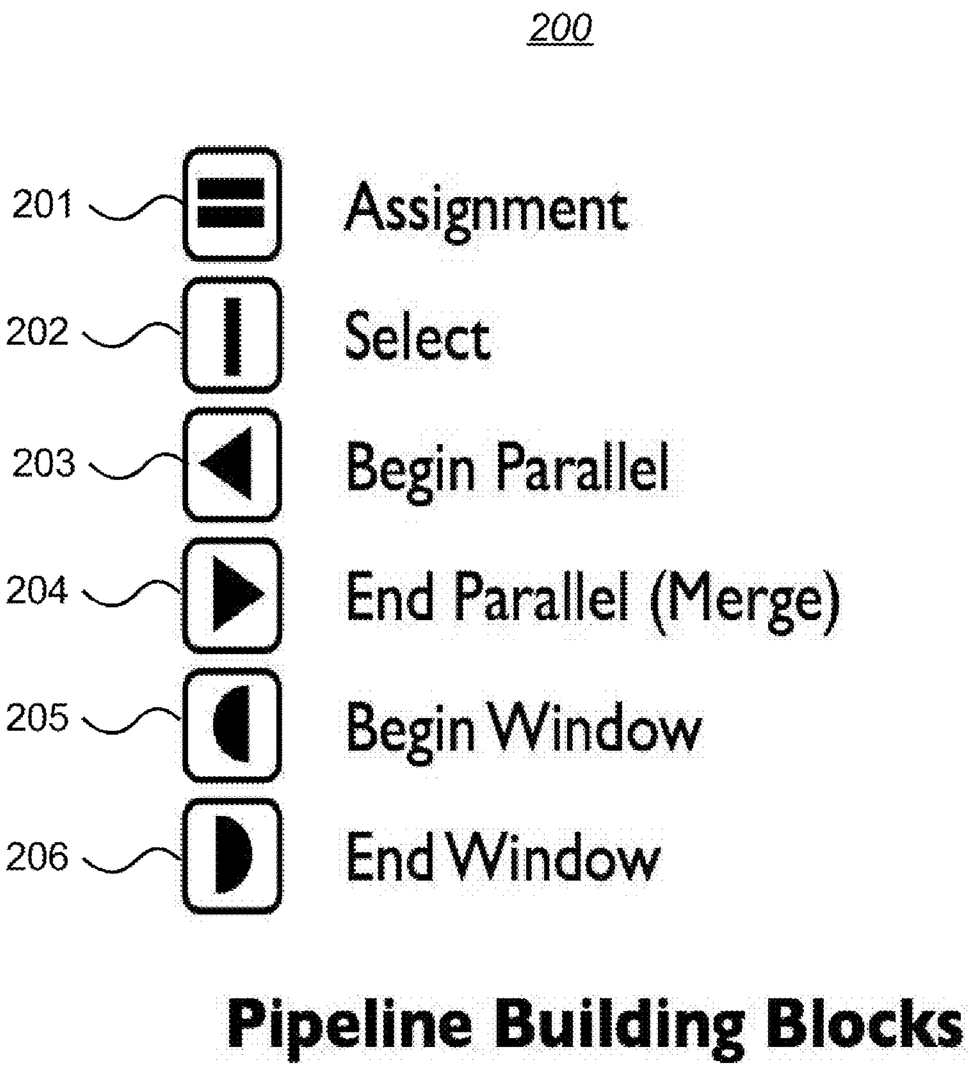
FIG. 2 is a block diagram illustrating a graphical representation of various types of pipeline building blocks utilized in the presently preferred embodiment.

In the ColumnFlow model of the present invention, a parallel program consists of a linear pipeline of Assignment, Selection, Parallel and Window building blocks. FIG. 2 is a block diagram 200 illustrating a graphical representation of the various types of pipeline (program) building blocks utilized in the presently preferred embodiment. As shown, the pipeline (program) building blocks include Assignment 201, Select 202, Begin Parallel 203, End Parallel (Merge) 204, Begin Window 205 and End Window 206. It should be noted that there are no nonlinear control flow or control structure mechanisms such as conditional statements or loops within the linear pipeline itself, although such mechanisms may be a part of the internal implementation of an individual block in some cases.

Figure 3:
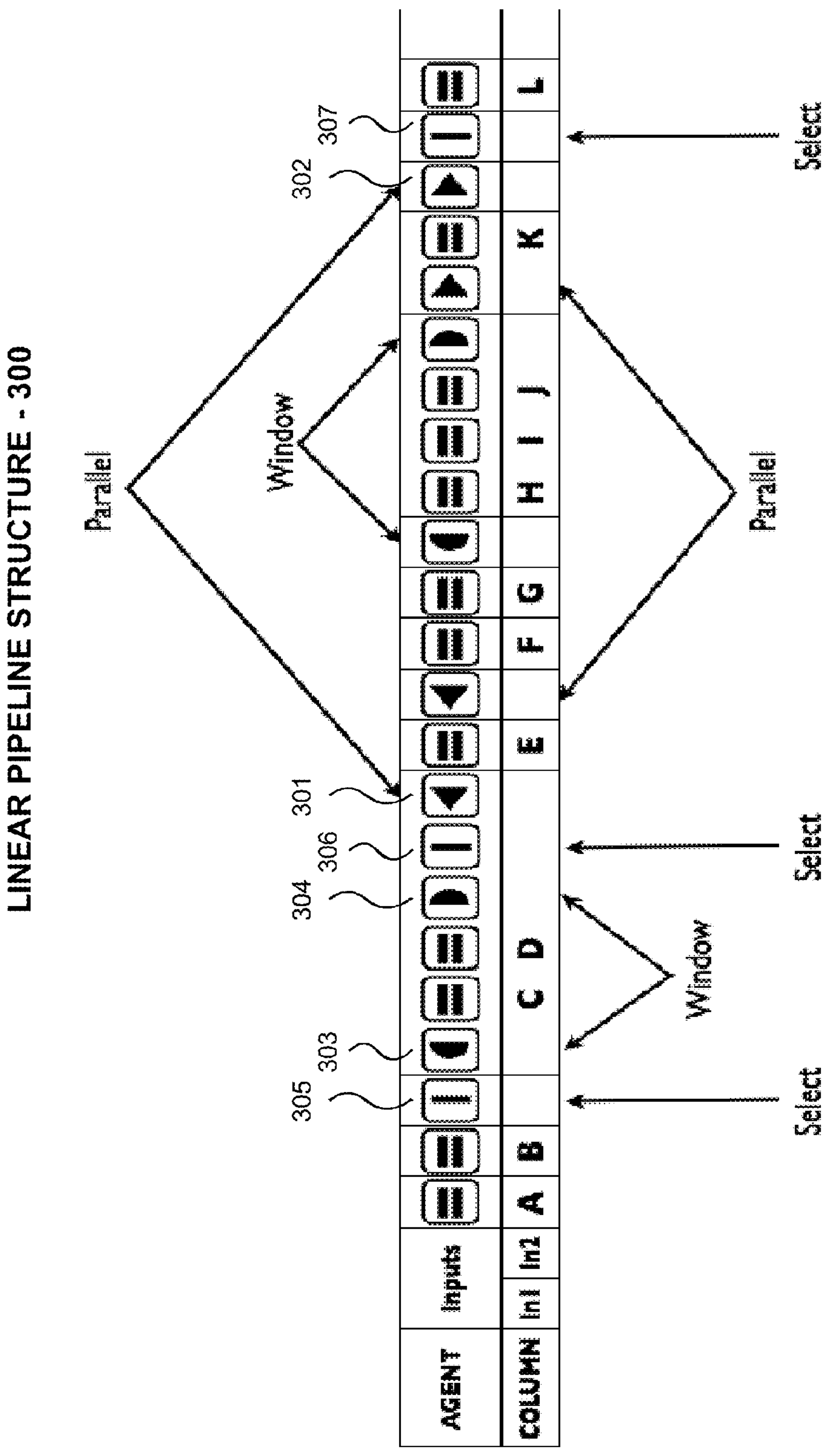
FIG. 3 is a diagram of an example linear pipeline structure illustrating how the building blocks depicted in FIG. 2 may be combined into a linear pipeline structure.

FIG. 3 is a diagram of an example linear pipeline structure 300 illustrating how the program building blocks (e.g., as depicted at 201-206 in FIG. 2) may be combined into a linear pipeline structure. As shown, for example, at 301 at FIG. 3, a Begin Parallel Block opens a parallel section that is closed by the matching End Parallel (Merge) block as shown at 302. There is no limit to the degree of nesting of Parallel-Merge sections. Each Window section is opened by a Begin Window Block as illustrated, for example, at 303 at FIG. 3 and is closed by the matching End Window Block as depicted at 304. For reasons of implementation efficiency, it is sometimes convenient to add a restriction that only Assignments may appear within a Window section. In certain embodiments of the ColumnFlow model of the present invention, there may also be a condition that, for efficiency reasons, a Selection Block may not appear within any Parallel-Merge section. Note that none of the Selection Blocks at 305, 306 and 307 in FIG. 3 are enclosed within any Parallel-Merge section.

When a ColumnFlow program is executed in accordance with the present invention, the static linear syntax of the pipeline gives rise to a dynamic series-parallel network of processing tasks. A ColumnFlow program has a single SCF input stream and produces a single SCF output stream. Therefore, the output of a ColumnFlow program can be used as the input to another program, either directly or with some post-processing applied beforehand. A ColumnFlow program with parametric parallelism corresponds to a whole collection of ColumnFlow programs and therefore produces a single SCF output steam for each one.

A ColumnFlow program processes the input stream and produces the output stream in a single pass. The operations performed by each block require only a finite, localized state, for example the values of the cells in a single row, in a consecutive pair of rows, or in the rows within a finite window. This can be illustrated by example.

EXAMPLE

Volume-Weighted Average Price

Before describing the details of each of the types of building blocks, a small example that shows how the various building blocks are used in the currently preferred embodiment of the present invention to construct a parallel stream processing program will be described. Consider for purposes of this example the following problem: Given a continuous stream of stock market data on up to 5000 companies, output the 10-minute volume-weighted average price for each company once every ten minutes. One can describe a method for solving this real-time problem in terms of the following pseudocode:

Example 1

```
1: Input Stream: Three columns <Company, Price, Volume> each with
infinitely many rows.
2:
3: Pseudocode:
4: Use five additional infinite columns A,B,C,D,E.
5:
6: A = Volume*Price.
7: For each Company (independently in parallel)
8:    For each 10 minute window (independently in parallel)
9:       B = sum of values in A for Company-window substream.
10:      C = sum of values in Volume for Company-window substream.
11:      D = True if row is first in Company-window substream, False
otherwise.
12: Select only the first row for each Company-window pair.
13: For the selected rows, E=B/C.
14:
15: Output Stream: Two infinite columns <Company, E>
```

FIG. 4 is an example illustration of a graphical user interface 400 of the present invention for designing a pipeline using the above-described pipeline building blocks with example "livesheet" data. This example illustrates how the above-described solution can be easily specified in the Graphical User Interface of the present invention. The pipeline for the ColumnFlow agent program is shown at 401, the first row in FIG. 4. Each of the building blocks is specified by filling in a simple GUI form with the required expression. As shown at 402 and 403, respectively, the second and third rows include the column names and types. The fourth row as depicted at 404 in FIG. 4 allows the user to specify which rows are to be included in the output stream. The remaining rows (fifth row and below) 405 can be used to display a snapshot of the values in the different columns as the data streams through the system. In contrast to the finite worksheets of a spreadsheet, a "livesheet" of the present invention corresponds to the possibly infinitely many rows of the live, streaming real-time data that are being processed by the system.

FIG. 5 shows an alternative arrangement of the heading rows for the graphical user interface 500, in which the Agent and Column rows are combined as illustrated at row 501, and in which there is an additional row in which an alternative SCF Column Name can be specified by the user as shown at 504 at FIG. 5. Note that the Column named E has SCF Column Name VWAP. When that column is output as part of the output SCF stream, it will be named VWAP.

The following example illustrates the same pipeline in the XML format that is automatically produced by the system of the present invention using the Graphical User Interface 400 depicted in FIG. 4:

Example 2

Pipeline in XML Form

```
1: <program>
2:    <inputoutputcolumn name="Company" type="string"/>
3:    <inputcolumn name="Price" type="real"/>
```

-continued

```
<inputcolumn name="Volume" type="integer"/>

<internalcolumn name="A" type="real"/>
<internalcolumn name="B" type="real"/>
<internalcolumn name="C" type="integer"/>
<internalcolumn name="D" type="boolean"/>

<outputcolumn name="E" type="real"/>

<windowdeclaration name="tenminutes">
    <align>
        <time>
            <string>2007-07-01T12:00:00Z</string>
        </time>
    </align>
    <duration>00:10:00</duration>
</windowdeclaration>

<assign>
    <column name="A"/>
    <expr>
        <function name="convert_to_real"><column
name="Volume"/></function>
        <op name="mul"/>
        <column name="Price"/>
    </expr>
</assign>
<parallel>
    <expr>
        <column name="Company"/>
    </expr>
    <window name="tenminutes">
        <assign>
            <column name="B"/>
            <expr><function
name="window_fill_sum_of_values"><column
name="A"/></function></expr>
        </assign>
        <assign>
            <column name="C"/>
            <expr><function
name="window_fill_sum_of_values"><column
name="Volume"/></function></expr>
        </assign>
        <assign>
            <column name="D"/>
            <expr><function
            name="window_mark_start"/></expr>
        </assign>
    </window>
</parallel>
<select>
    <expr>
        <column name="D"/>
    </expr>
    <assign>
        <column name="E"/>
        <expr>
            <column name="B"/>
            <op name="div"/>
<function name="convert_to_real"><column
 name="C"/></function>
        </expr>
    </assign>
</select>
</program>
```

The comprehensive XML tagging that is maintained as illustrated in the above example enables a wide range of dependency and type checking to be performed before any program is run, reducing program errors.

The following example shows the same pipeline in the form of C++ program code that is obtained automatically from the XML form by the present invention using a schema-driven XSLT transformation. The resulting C++ code is in the form that a runtime system of a particular C++-based embodiment of the present invention can execute directly.

Example 3

Pipeline in C++ Form

```

#include <library/simple.hpp>
using namespace pinpoint :: simple_language;

void program( )
{
  Column <string> company (InputAndOutput, L"Company");
  Column <real> price (Input, L"Price");
  Column <integer> volume (Input, L"Volume");
  Column <real> A;
  Column <real> B;
  Column <integer> C;
  Column <boolean> D;
  Column <real> E (Output, L"VWAP");

  Window tenminutes("2007-07-01T12:00:00Z","00:10:00");

  A= convert_to_real( volume ) * price;
  parallel(company, 5000);
          parallel(tenminutes);
                  B=window_fill_sum_of_values(A);
                  C=window_fill_sum_of_values(volume);
                  D=window_mark_start( );
          merge( );

  merge( );
  select(D);
  E= B / convert_to_real(C);
}
```

Assignment Blocks

In the currently preferred embodiment, an Assignment Block is used to set the values in some column that is not an input column, and has not previously been set by an assignment elsewhere in the pipeline. An Assignment Block is data-parallel on its column, i.e., an Assignment Block sets the values for all rows in that column.

The present invention allows for an open, extensible library of powerful Assignment Block primitives for use in parallel stream processing. In its currently preferred embodiment, the present invention includes a library of such blocks (described later in this document) that cover a very wide range of stream processing applications, although those skilled in the art will appreciate that additional Assignment Blocks covering additional expressions may be added, if desired.

Window Blocks

In the presently preferred embodiment, certain Assignment functions may only be used in the context of a "window" that partitions the stream into contiguous intervals. Windows can be time-based, size-based, or based on some general Boolean expression. For example, a time-based window can be defined by giving a window length and alignment. In Example 2 (above) an XML example is given where the following time-based window is used:

```
<windowdeclaration name="tenminutes">
    <align>
        <time>
            <string>2007-07-01T12:00:00Z</string>
        </time>
    </align>
```

-continued

```
        <duration>00:10:00</duration>
</windowdeclaration>
```

In this case, the stream is being divided into 10-minute intervals, aligned at 12 noon (i.e., into disjoint intervals starting at 12:00, 12:10, 12:20, etc.). Such time-based windows might be internally defined by providing a Boolean expression such as the following where "/" denotes integer division:

```
(timestamp(row)−alignment) / length > ((previous(timestamp(row)) −
alignment) / length
```

Similarly, a size-based window can be specified by giving a Boolean expression such as the following in which "%" denotes the remainder operation:

rownumber(row) % windowsize==0

Other forms of windowing can also be easily specified using Boolean expressions. For example, a "punctuation-based" window can be expressed as follows:

row_string_value=="punctuation string"

As another example, a "change of direction" window can be provided as follows:

```
(rowval − previous(rowval)) * (previous(rowval) −
previous(previous(rowval))) < 0
```

Those skilled in the art will appreciate that the above are only examples and that various other forms of windowing can be specified using Boolean expressions, as desired.

Recall that Example 2 described earlier in this document included a window section as follows:

```
<window name="tenminutes">
    <assign>
        <column name="B"/>
        <expr><function
name="window_fill_sum_of_values"><column
name="A"/></function></expr>
    </assign>
    <assign>
        <column name="C"/>
        <expr><function
name="window_fill_sum_of_values"><column
name="Volume"/></function></expr>
    </assign>
    <assign>
        <column name="D"/>
        <expr><function name="window_mark_start"/></expr>
    </assign>
</window>
```

In this case, the three window functions within the window section are evaluated independently for each finite substream corresponding to a ten-minute interval aligned at 12 noon.

Since the evaluation of these window functions on one window is quite independent of the evaluation on another window, the evaluations can be carried out in parallel if that would provide improved performance in a given situation. Whereas both dynamic and static Parallel Blocks (discussed below) split the infinite stream into a finite number of disjoint non-contiguous infinite substreams, a Window Block splits the stream into an infinite number of disjoint finite contiguous substreams ("windows"). The C++ implementation illustrated above in Example 3 includes the following:

```
Window tenminutes("2007-07-01T12:00:00Z","00:10:00");

A= convert_to_real( volume ) * price;
parallel(company, 5000);
        parallel(tenminutes);
                B=window_fill_sum_of_values(A);
                C=window_fill_sum_of_values(volume);
                D=window_mark_start( );
        merge( );
```

This C++ code is an automatic translation of the XML window section shown above.

Selection Blocks

A Selection Block primitive removes rows from a stream based on a Boolean expression. As noted above, in certain embodiments of the present invention there may be a condition that, for efficiency reasons, a Selection Block may not appear within a Parallel-Merge section. In cases where this applies, the end of all Selection Blocks should be at the end of the program. Example 2 illustrated above includes the following:

```
<select>
    <expr>
        <column name="D"/>
    </expr>
    <assign>
        <column name="E"/>
        <expr>
            <column name="B"/>
            <op name="div"/>
<function name="convert_to_real"><column name="C"/>
</function>
        </expr>
    </assign>
</select>
```

The above Selection section removes all rows in the stream where the value in column D is false, and for the rows that remain, sets the value in column E to the value B/C. We can view the Selection section as changing the context for the Assignment to column E from the whole stream to the substream with only those rows where column D is True.

Parallel Blocks

A ColumnFlow pipeline may contain one or more Parallel sections, each of which starts with a Begin Parallel Block and ends with a matching End Parallel (Merge) block. Parallel sections may be nested within one another. With Parallel sections it is possible to split up the data stream into a number of disjoint substreams. Leaving aside the contiguous form of window parallelism described above, the currently preferred embodiment of the present invention supports two forms of Parallel Block, which are referred to as "Dynamic" and "Static" Parallel Blocks. These two forms are discussed in turn below.

When a ColumnFlow program with a "Dynamic" Parallel section is run, the values of the specified tuple of expressions are dynamically evaluated on each row of the stream and used to partition the computation into a dynamically evolving set of disjoint concurrent subprograms, each of which again has a single input stream and a single output stream. At the end of the Parallel section, these multiple streams are merged together in timestamp order to reproduce a single stream.

Recall that the XML illustrated above in Example 2 includes the following:

```
30: <parallel>
31:        <expr>
32:               <column name="Company"/>
33:        </expr>
...
48: </parallel>
```

This splits up the stream into as many substreams as there are distinct values in Company, subject to the system default maximum number of substreams (e.g., a default maximum of 10,000). The various pipeline blocks between the <parallel> and </parallel> tags (e.g., between lines 30 and 48 above) are executed on these disjoint substreams completely independently in parallel. Similarly, the C++ version illustrated above in Example 3 includes the following:

```
19: parallel(company, 5000);
...
26: merge( );
```

In the case of this C++ example, the user has optionally specified an upper bound of 5000 on the maximum number of substreams to be dynamically generated. In either case, when the maximum number of substreams is reached and a row is encountered where the Company value does not already have an associated substream, then that row is marked in a special error column, so that on output, the user may inspect the error column and be aware that the maximum number of substreams was exceeded.

The following Example 4 illustrates a small C++ example program in which the maximum number of substreams is set to 2, but three distinct values are encountered in the A column.

Example 4

Maximum Size and Error Column in Parallel

```
1:  #include <library/simple.hpp>
2:  using namespace pinpoint :: simple_language ;
3:
4:  void program( )
5:  {
6:     Column< integer > a( Input, L"A");
7:     Column< integer > b( InputAndOutput, L"B");
8:     Column< integer > c( Output, L"C");
9:     ErrorColumn        e( L"E");
10:
11:    parallel( a, 2);   // maximum number of groups = 2
12:       c = prefix_sum(b);
13:    merge( );
14: }
15:
16: SCF Input:
17: [ { }, [ "A", "B" ], [ "integer", "integer" ]
18: , [ 1, 1]
19: , [ 2, 2]
20: , [ 3, 3]
21: , [ 2, 4]
22: , [ 3, 5]
23: , [ 1, 6]
24: ]
25:
```

-continued

```
26: SCF Output:
27: [
28:     { }
29: , [ "B", "C", "E"]
30: , ["integer", "integer", "bool"]
31: , [ 1, 1, false]
32: , [ 2, 2, false]
33: , [ 3, 0, true]
34: , [ 4, 6, false]
35: , [ 5, 0, true]
36: , [ 6, 7, false]
37: ]
```

As shown above at lines 33 and 35, the error column "E" shows that the rows where A=3 were not processed correctly due to the limitation. However, all other rows were computed correctly, with the correct prefix sums values calculated.

The present invention permits both Static and Dynamic Parallel Blocks to be used. In certain cases, a user may know exactly the values that need to be processed for a particular column. In such cases, it will often be more appropriate to use a Static Parallel Block. For example, in a C++ implementation, a user can write the following:

```
1: const array< string, 3> car = { { L"GM", L"Ford", L"Chrysler" } };
2: parallel( company, car );
3: ...
4: merge( );
```

If a program is processing a stream of Company information about the three car companies named above (i.e., GM, Ford and Chrysler), then this Static Parallel Block will split up the stream into exactly three disjoint substreams. The following Example 5 illustrates a small example C++ program implementation of a static Parallel Block:

Example 5

Static Parallel Construct

```
1: #include <library/simple.hpp>
2: using namespace pinpoint :: simple_language;
3:
4: void program( )
5: {
6:    Column< string > company( InputAndOutput, L"Company");
7:    Column< integer> a( Input, L"A");
8:    Column< integer> b( Output, L"B");
9:
10:   const array< string, 3> companies= { { L"GOOG",
      L"MSFT", L"YHOO" }
};
11:
12:   parallel( company, companies);
13:      b = prefix_sum(a);
14:   merge( );
15: }
16:
17: SCF Input:
18: [ { }, [ "Company", "A" ], ["string", "integer"]
19: , [ "GOOG", 1 ]
20: , [ "MSFT", 2 ]
21: , [ "ADBE", 3 ]
22: , [ "YHOO", 4]
23: , [ "MSFT", 5]
24: , [ "GOOG", 6]
25: , [ "INTC", 7]
```

-continued

```
26: ]
27:
28: SCF Output:
29: [
30:   { }
31: , [ "Company", "B"]
32: , ["string", "integer"]
33: , [ "GOOG", 1]
34: , [ "MSFT", 2]
35: , [ "ADBE", 0]
36: , [ "YHOO", 4]
37: , [ "MSFT", 7]
38: , [ "GOOG", 7]
39: , [ "INTC", 0]
40: ]
```

It should be noted that with the above Static Parallel construct, the correct prefix sums are calculated for the three companies of interest (i.e., GOOG, MSFT and YHOO). Rows with information on other companies (e.g., ADBE, INTC) are ignored, and the error column is set for those rows.

System Components

Graphical User Interface

The present invention provides a linear pipeline model for general-purpose parallel stream processing. In its currently preferred embodiment, the present invention includes a Graphical User Interface (GUI) feature (e.g., as previously illustrated at FIG. 4 or the alternative embodiment shown at FIG. 5) that assists users in designing both simple and complex parallel stream processing programs. Although the invention also allows programs to be designed in a standard programming language or in an XML Application Programming Interface, the GUI design approach utilized in the currently preferred embodiment has many advantages, both in terms of ease-of-use and in terms of designing correct programs.

Visual programming, using graphical building blocks rather than conventional programming language syntax, has been a major challenge in computing for many years. One of the biggest difficulties is developing a visual programming model that can scale to allow complex programs to be written. The nonlinear control flows that are common in most programming models usually mean that such a visual programming system quickly becomes a complex tangle of graphical wires and connections as the complexity of the programs increases.

The linear pipeline structure of a ColumnFlow program of the present invention allows the present invention to provide a GUI-based program development system that can scale to very complex programs, as it is "wire-less" in that a program can be represented simply as a linear sequence of building blocks with no additional wires, connections or other forms of nonlinear control flow.

The Graphical User Interface of the present invention for parallel stream processing is easy-to-use, scales to handle complex programs, and allows continuous dependency checking and control during program design using simple static analysis techniques. The GUI also supports type checking and complexity analysis of programs. In its presently preferred embodiment, the GUI generates an XML syntax that captures the functionality of the program, and which can be directly translated into a standard programming language such as C++. The XML produced using the GUI and other components of the present invention (e.g., as illustrated in Example 2 above) conforms to the open Application Programming Interface of the present invention in which a program is represented as a linear sequence of XML building blocks. An example of C++ code derived directly from the XML form is illustrated in Example 3 above.

The system's GUI feature is designed to be as easy to use as a spreadsheet, and has many surface similarities to a spreadsheet, but the underlying continuous parallel stream processing software model is quite unlike the conventional spreadsheet software implementations. Referring again to the Graphical User Interface 400 shown in FIG. 4, the first row (at 401) shows the pipeline for the ColumnFlow agent program. The second and third rows give the column names and types as illustrated at 402, 403 in FIG. 4. As shown at 404 in FIG. 4, the fourth row allows the user to specify which rows are to be included in the output stream. As shown in FIG. 5, an alternative embodiment of the Graphical User Interface 500 includes a row in which an alternative SCF Column Name may be specified as illustrated at 504 at FIG. 5.

Starting with the input columns, new columns can be inserted into the pipeline by specifying the position in the pipeline, the name of the column, its type, and giving the expression for its Assignment Block, using a form (not separately shown in FIGS. 4, 5) provided by the system's GUI feature. Additionally, menus (not separately shown in FIGS. 4, 5) provide guidance on function names, and an expression wizard (not separately shown in FIGS. 4, 5) provides assistance in ensuring parameter orderings and types are specified correctly.

New Begin Parallel-End Parallel Block pairs, new Select Blocks, and new Begin Window-End Window Block pairs can be inserted into a pipeline by specifying the position within the pipeline and the various parameters using a simple GUI form. Initially Begin Parallel-End Parallel Block pairs are initially adjacent in the pipeline, but may then have other blocks inserted between them as the pipeline design grows. The same applies to Begin Window-End Window pairs.

Individual Assignment Blocks and Select Blocks may be moved around within a pipeline, as long as any new Assignment position does not create a dependency violation, and any new Select Block position does not create a structure violation within the pipeline. Additional Window or Parallel sections within a pipeline may also be moved around, as long as the new positions do not create pipeline structure violations.

Using the GUI of the present invention for program development rather than an XML Application Programming Interface ensures that program design errors are minimized. The GUI performs continuous static dependency and type checking during program design, ensuring that there are no programming errors where an undefined column is used, where a column is defined more than once, where an undefined window is used, where a Window is defined more than once, where the pipeline structure is invalid, or where expressions contain type errors. In addition to program development and checking, the GUI is used for a number of other simple tasks, including specifying the rules for conversion of data streams into the SCF format, as described earlier, and for the Control Panel operations described in the next section.

The GUI design of the present invention, in its currently preferred embodiment, is implemented as a Rich Internet Application using Adobe Flex (available from Adobe Systems, Inc. of San Jose, Calif.), and can therefore be used from within any standard web browser, such as Firefox available from Mozilla (mozilla.org) or Internet Explorer available from Microsoft Corporation, allowing pipeline design to be carried out within the browser. The GUI design is platform independent and could be easily ported to other Rich Internet Application platforms such as, for instance, the Microsoft Silverlight platform. The GUI design could also be easily integrated into standard spreadsheets such as Microsoft Excel as an add-in using the standard Microsoft tools, allowing pipeline design to be carried out within a spreadsheet.

Dashboards

With the present invention, the output from a stream processing pipeline can be supplied directly to a spreadsheet (e.g., a Microsoft Excel spreadsheet or an OpenOffice Calc spreadsheet). Excel provides a worksheet function called RealTimeData (RTD) that allows a program to call a Component Object Model (COM) or Distributed Component Object Model (DCOM) Automation Server for retrieving data in real-time. In the presently preferred embodiment, this standard Microsoft Excel interface is used to connect a ColumnFlow pipeline to an Excel spreadsheet. For further description of the Excel Real Time Data feature, see e.g., MacDonald, Matthew "Getting Real-Time Data from the Web in Excel" available from the O'Reilly Windows DevCenter (Feb. 8, 2005), the description of which is hereby incorporated by reference.

Parallel Stream Processing System

Figure 6:
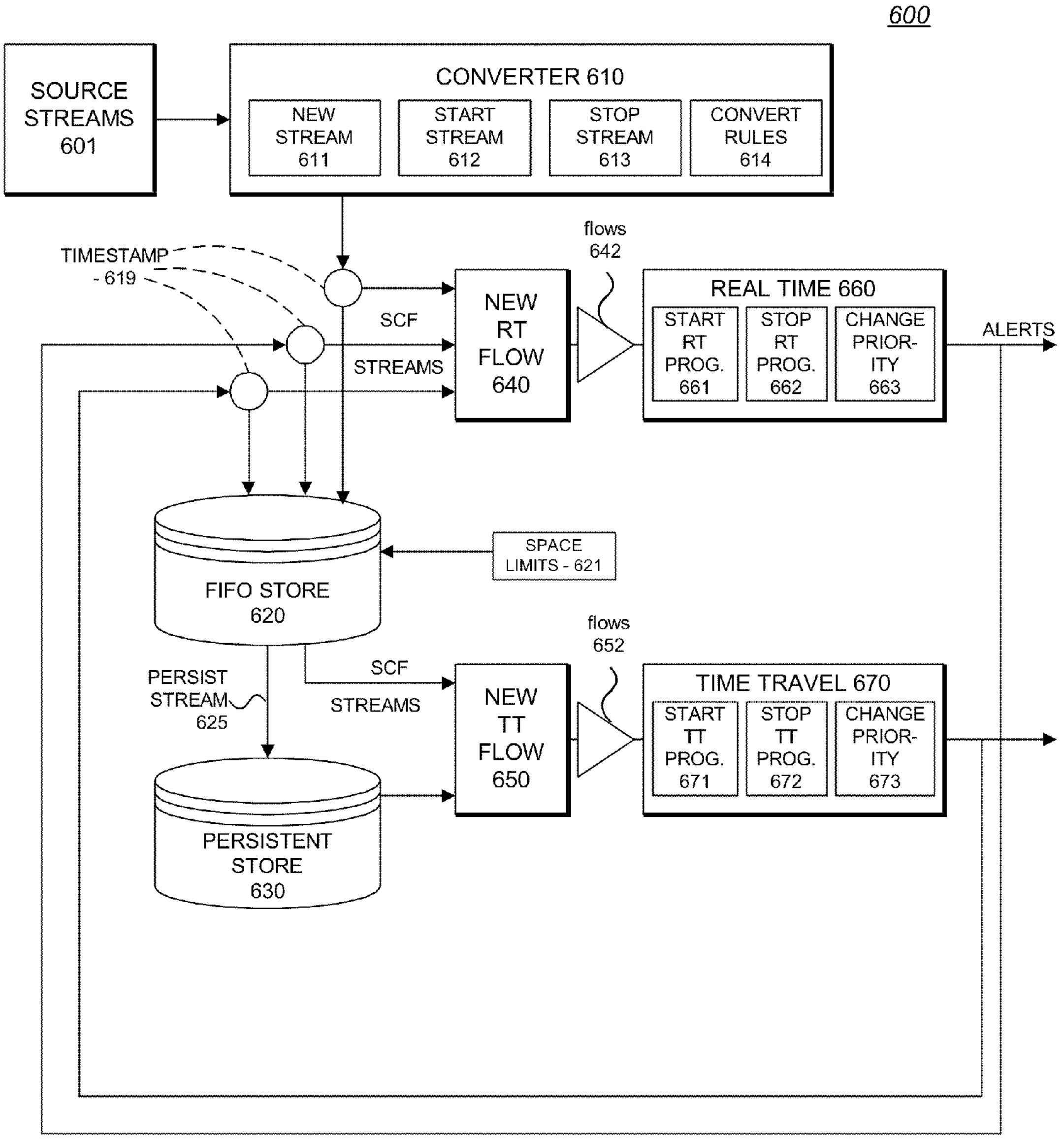
FIG. 6 is a flow diagram of a parallel stream processing system (PSPS) environment providing a high level view of the operation of the present invention.

One embodiment of the present invention comprises a parallel stream processing system (PSPS) which, at any one time, may be simultaneously performing a large number of concurrent tasks: converting many source data streams of different formats into a standard stream format (i.e., SCF), generating a number of different flows from those standardized streams, running many real time programs on each of those flows, and running many programs on flows derived from historical stream data. FIG. 6 is a flow diagram of a parallel stream processing system (PSPS) environment 600 providing a high level view of the operation of the PSPS of the present invention. As shown, the PSPS of the present invention includes the following components: Converter 610, TimeStamp Module 619, FIFO Store 620, Persistent Store 630, New Real Time (RT) Flow control 640, New Time Travel (TT) Flow control 650, Real Time Runtime System 660 and Time Travel Runtime System 670.

Control Panel

In its currently preferred embodiment, the GUI Control Panel of the PSPS (not separately shown at FIG. 6) supports the following operations:

NEW STREAM 611, SPACE LIMITS 621, CONVERT RULES 614. New SCF streams can be added to the system as illustrated at New Stream 611 at FIG. 6 by specifying the name of the stream, the source of the data (e.g. Web URI or local file name), the space limits for the stream, the convert rules (e.g., Convert Rules 614 as shown at FIG. 6) for the stream (see earlier section on conversion to SCF), and the names of any columns that should also be indexed as the stream is generated. Since many streams are infinite, it is important to be able to define rules governing how large a given stream should be allowed to grow, and how it should be treated when that maximum limitation is reached. A First-In-First-Out (FIFO) rule is commonly used when only a finite fragment of an infinite stream can be stored, and is used in the currently preferred embodiment of the PSPS, although other rules are possible. In the PSPS, space limits (e.g., as shown at 621 at FIG. 6) are used to define the size of the FIFO for each SCF stream within the FIFO Store 620. All space limits are optional, and can be adjusted by a user from time to time. Any or all limits can be left blank, as in the currently preferred embodiment a blank entry means that there is no limit of that particular kind (days, bytes, rows). Setting any one of maximum time, maximum size or maximum rows to zero means that no fragment of the stream should be stored, which may be appropriate in certain pure streaming environments. Size and row limits are applied only between the minimum and maximum time limits.

PERSIST STREAM 625. At any point in time, the current start time and end time of the fragment of a given stream S held in the FIFO Store 620 can be inspected, and a subinterval of that fragment chosen and copied to the Persistent Store 630 as a new finite persist stream 625. Persistent streams have no space limits and will remain in the Persistent Store 630 until deleted.

START STREAM 612, STOP STREAM 613. Once a new stream has been defined, with its source given, its space limits set, and its convert and indexing rules defined, it can be started at any time. Starting the stream (e.g., Start Stream 612) will begin the process of getting the raw source data, transforming and indexing it into SCF, making it available for use in flows to be used by stream processing programs, and saving a fragment of it in the FIFO Store. Stopping a stream (e.g., Stop Stream 613) terminates all of these activities, although the stream definition remains and the stream can be started again at any later time.

NEW REAL TIME (RT) FLOW 640, NEW TIME TRAVEL (TT) FLOW 650. In the currently preferred embodiment of the PSPS, a ColumnFlow program can be run in Real Time Mode or in Time Travel Mode. In Real Time Mode, the program is running on a potentially infinite stream of live data that is streaming in either from an external source or from the output of another stream processing program. In this mode, the program is continuously receiving new data in real time. In Time Travel Mode, the program is running on a finite fragment of data that is held in the FIFO Store 620 or in the Persistent Store 630. In the PSPS 600, a program runs on a Flow (e.g., as shown at real time flows 642 or time travel flow 652) which is simply a subset of the columns in some stream. This means that each stream may have many different flows. New flows may be created by a user using the Real Time (RT) and Travel Time Flow controls 640 and 650, respectively as shown in FIG. 6. Different programs running on the same overall stream of data may run on quite different flows (i.e., quite different subsets of the columns). In addition to selecting the subset of columns, the definition of a Real Time flow requires a start time for the flow that is no earlier than the current end time (the current end time is the time of the most recent row of the stream). Thus, the start time for a Real Time flow can be now (i.e., immediately) or in the future. The definition of a Time Travel flow requires a start time for the flow and an end time for the flow that are both within the time interval of the available finite fragment of the stream.

START RT PROGRAM 661, START TT PROGRAM 671, STOP (RT or TT) PROGRAM 662, 672, CHANGE PRIORITY (of RT or TT PROGRAM) 663, 673. A ColumnFlow program can be started on the system (e.g., Start RT Program 661, Start TT Program 671) by giving the name of the program and the name of the Real Time or Time Travel flow on which it should be run. When there is insufficient capacity available to the system, lower priority programs may need to be temporarily suspended in order to allow higher priority programs to be launched. For example, a user may assign a higher priority (e.g., Change Priority 663) to certain Real Time programs so that such Real Time programs continue to deliver real time output. Similarly, a user may also change priority of Travel Time programs via Change Priority 673. Stop (RT or TT) Program 662, 672 providing for stopping ColumnFlow programs.

System Operation

After streams have been added and started as described above, the PSPS, in its currently preferred embodiment, generally operates as follows at runtime:

Once a new stream has been created (e.g., Add Stream 611) and started (e.g., Start Stream 612), the source data stream 601 (e.g., table, text, feed or graph) enters the system and is immediately transformed by the Converter 610, using the specified Convert Rules 614 and timestamped by the Timestamp module 619 to create a timestamped stream S in the SCF format.

The rows of S are continuously added to the FIFO Store 620 for S, in accordance with any specified space limits 621 for S.

If there is an active real time program Program RT running on a flow FlowRT 640, 642 derived from S then the rows of S are also supplied directly to the runtime Real Time system 660 for FlowRT to be processed by ProgramRT.

The SCF stream StreamRT produced by ProgramRT on Real Time Runtime System 660 is output to any external device that has been set up to receive alerts from ProgramRT. StreamRT is also timestamped 619 and continuously added to the FIFO Store 620 for StreamRT and supplied directly to the runtime system for any flows 640, 642 that are derived from StreamRT and have at least one active real time program running on them.

If there is an active time travel program ProgramTT on Time Travel Runtime System 671 running on a flow FlowTT 650, 652 derived from a finite SCF stream held in either the FIFO Store or the Persistent Store, then the rows of that stream are supplied to the Time Travel Runtime System 670 for FlowTT to be processed by ProgramTT.

The outputs from a program run in Time Travel Mode are handled in the same way as the outputs from a program running in Real Time Mode. The SCF stream StreamTT produced by ProgramTT on Time Travel Runtime System 670 is output to any external device that has been set up to receive alerts from ProgramTT. StreamTT is also continuously timestamped 619 and added to the FIFO Store 620 for StreamTT and supplied directly to the runtime system for any flows 650, 652 that are derived from StreamTT and have at least one active real time program running on them.

At any one time, the PSPS will be simultaneously converting many different source data streams to SCF, generating a number of different flows on each of those SCF streams, and running many RT and TT programs on each of those flows. With such a large number of concurrent tasks to be performed, and with multiple levels of parallelism available to be exploited within each flow and within each program, as described above, the invention provides a major opportunity to build new stream processing architectures that exploit massive parallelism. Offering essentially unlimited scalability, these architectures can address the world's most demanding and complex stream processing applications on live and historical data streams.

In contrast to the manner in which most databases are organized, the present invention allows data within the FIFO Store and Persistent Store to be organized as high performance column structures rather than as row structures. This means that extracting particular subsets of columns for the various flows is much more efficient, as only those columns that are needed are read. Organizing by columns rather than by rows also allows space-efficient compression of columns using standard data compression techniques such as run-length encoding. In many cases, this column compression improves not only space efficiency but also time efficiency, as programs can operate directly on the compressed form in a way that is much faster than would be possible on the uncompressed form. For example, the system might store a contiguous segment of one hundred values from a column C as 13×1, 42×0, 25×2, 20×0, indicating that the segment consists of thirteen copies of the value 1, then forty-two copies of the value 0, then twenty-five copies of the value 2, and finally another twenty copies of the value 0. Assuming one has an Assignment Block in which column A is assigned the value of the product of columns B and C, then a lot of computation time may be saved by working directly with the compressed forms of the columns rather than the uncompressed form. The single-pass form of stream processing of the present invention makes such compression-based optimizations both simple and powerful. The operations of the Real Time and Travel Time Runtime Systems of the present invention will next be described.

Runtime Systems

As illustrated at FIG. 6 and previously discussed, the PSPS system 600 includes a Real Time Runtime System 660 and a Travel Time Runtime System 670. The Runtime System for Time Travel programs (i.e., Time Travel 670 at FIG. 6) gets its finite set of rows of input stream data from a datastore, either from the FIFO Store 620 or from the Persistent Store 630. The Runtime System for Real Time programs (i.e., Real Time 660 at FIG. 6), on the other hand, gets its possibly infinite set of rows of input stream data from a live external source. This distinction is significant in terms of performance, in that Time Travel programs are not constrained by the need to continuously check for the availability of new data. In other respects, however, the two Runtime Systems are similar in that they repeatedly process one block of rows after another, as the rows of data stream in.

Figure 7:
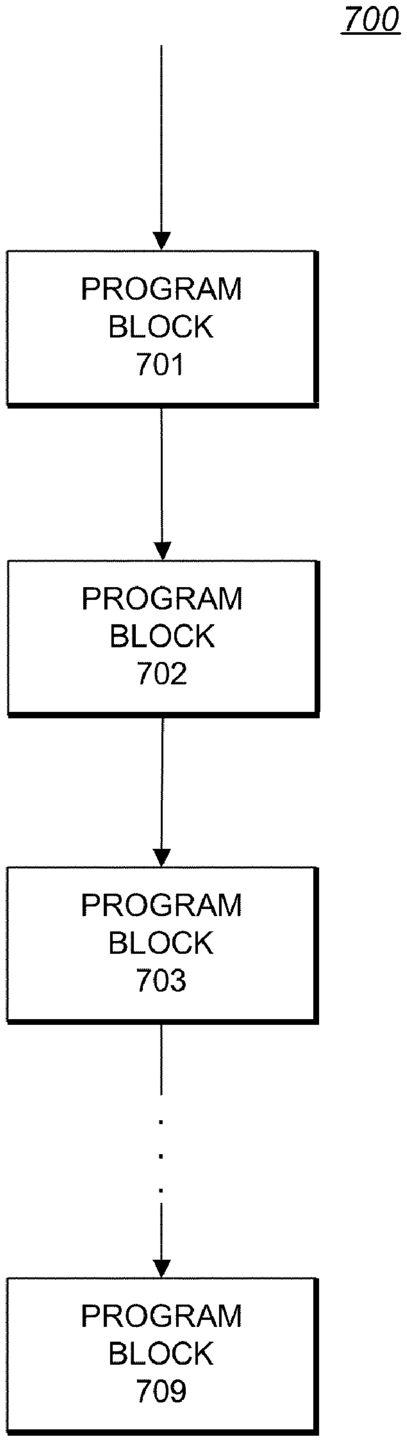
FIG. 7 is a block diagram illustrating a linear chain of program blocks.

Within both the Real Time and Time Travel Runtime Systems, processing is performed in an iterative loop. Each time through the loop, the Runtime System executes a number of Program Blocks in sequence. FIG. 7 is a block diagram illustrating such a linear chain 700 of Program Blocks 701, 702, 703, . . . , 709. Within a single Program Block the set of Assignment Blocks and other operations will have the property that the data distribution required for them is the same.

Figure 8A:
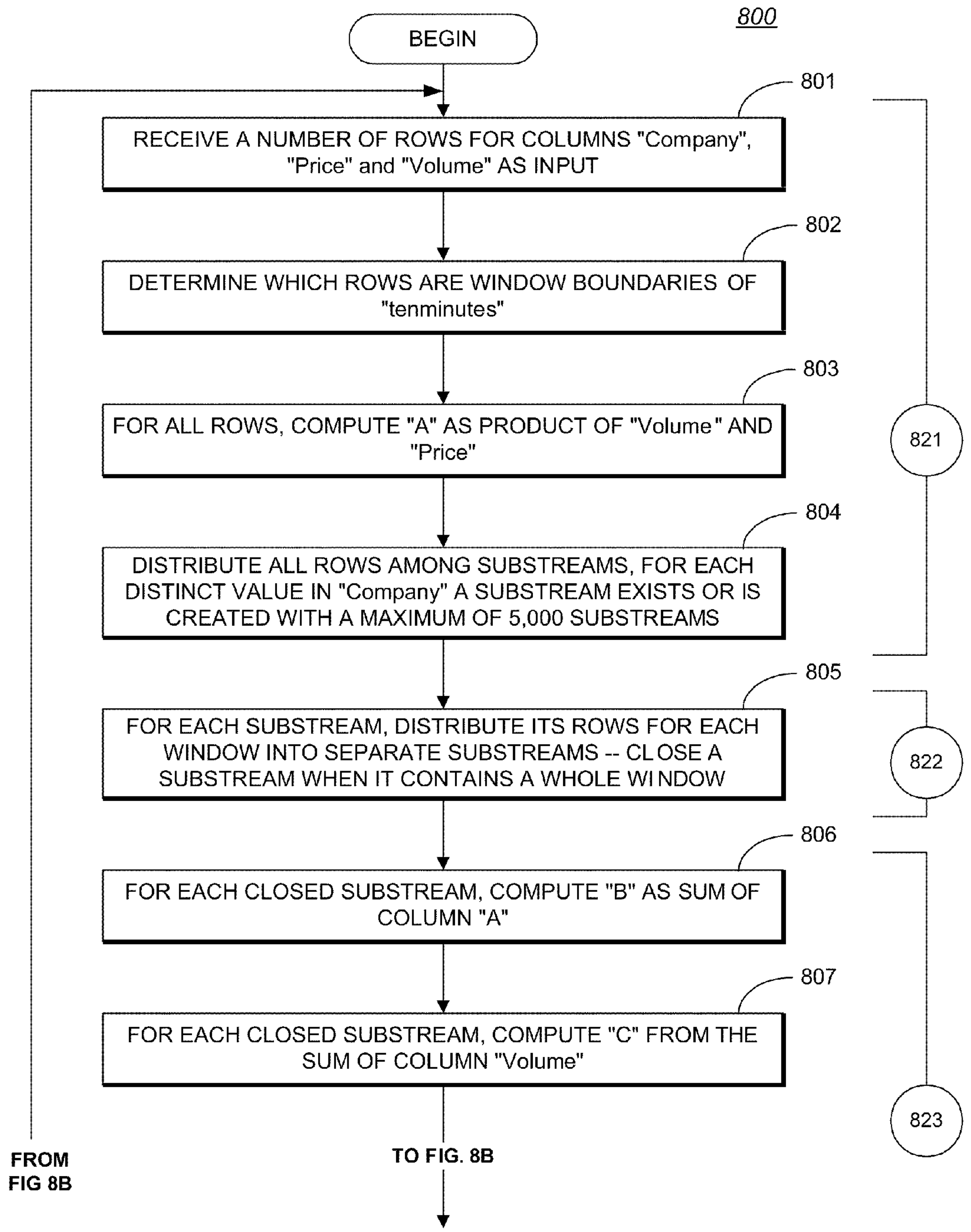
FIGS. 8A-B comprise a single flowchart depicting the execution of an example Real Time Program in the Real Time Runtime System of the present invention.
Figure 8B:
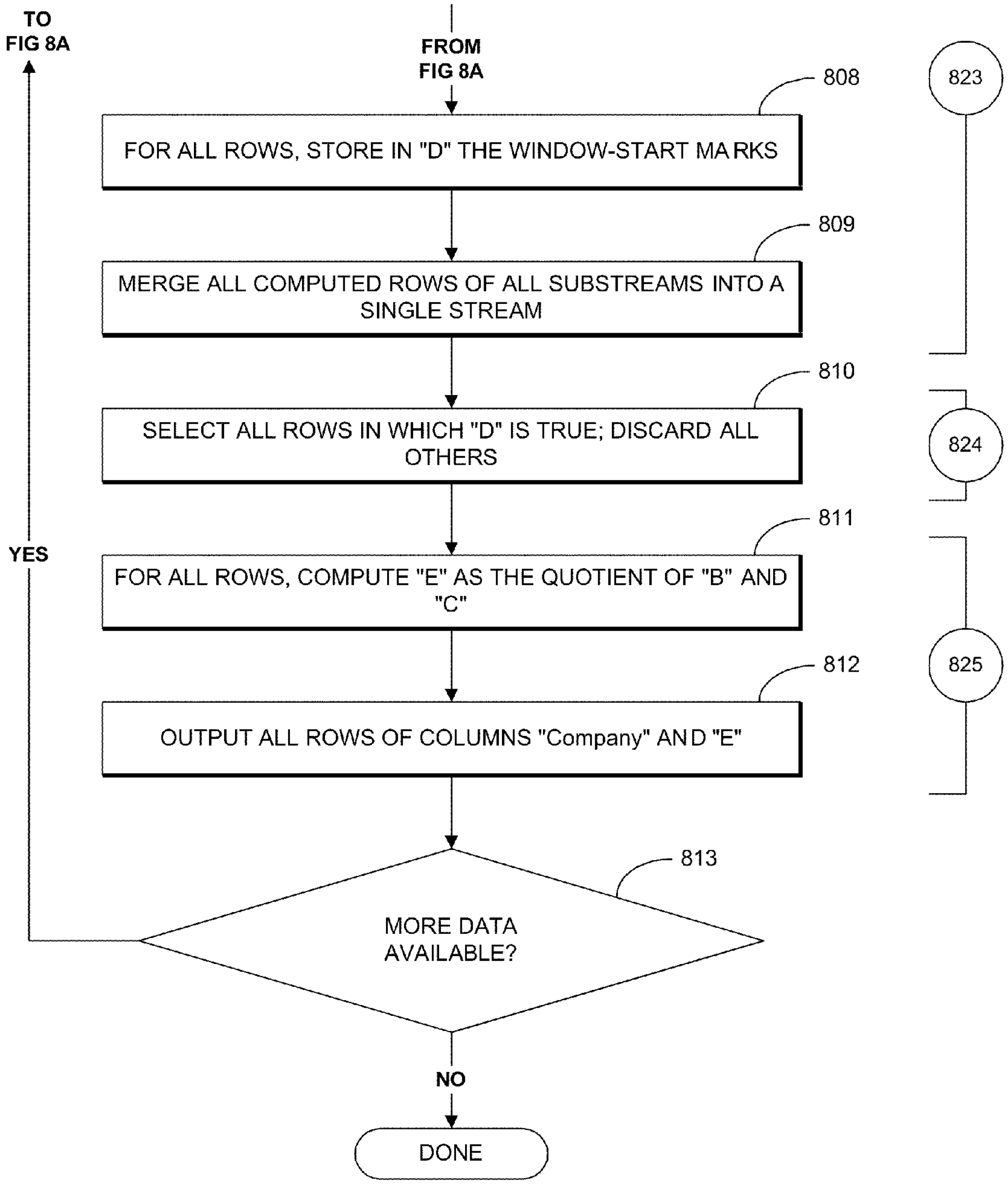

The processing of programs by the Real Time and Travel Time Runtime Systems may be illustrated by example. For instance, FIGS. 8A-B comprise a single flowchart 800 depicting the execution of an example Real Time Program in the Real Time Runtime System of the present invention. For purposes the following discussion, the example Volume-Weighted Average Price program previously described in Examples 1, 2 and 3 above is used to illustrate these operations. Furthermore, it is assumed that an incoming stream of real time data has previously been converted to SCF format and timestamped as discussed above and illustrated in FIG. 6.

The process begins at step 801 with the receipt of a number of rows for columns "Company", "Price" and "Volume" as input. At step 802, it is determined which rows are window boundaries of "tenminutes". At step 803, for all rows "A" is computed as the product of "Volume" and "Price". Next, all rows are distributed among substreams, and for each distinct value in "Company", a substream exists or is created (up to an optional maximum of 5,000 substreams specified by the user) as provided at step 804 at FIG. 8A.

At step 805, for each substream rows for each window are distributed into separate substreams—a substream is closed when it contains a whole window. For each closed substream, "B" is computed as the sum of column "A" at step 806. Next, at 807, "C" is computed from the sum of column "Volume". At step 808 shown at FIG. 8B, the window-start marks for all rows are stored in "D". All computed rows of all substreams are merged into a single stream at step 809. At step 810, all rows in which "D" is set to true are selected; all others are discarded. For all rows, "E" is computed as the quotient of "B" and "C" as provided at 811. At 812, all rows of columns "Company" and "E" are output. At decision 813, a determination is made as to whether more data is available. If more data is available, the process is repeated commencing at step 801 to process additional data. Otherwise, if no more data is available, the process is complete.

It should also be noted that the above steps are broken into several program blocks for purposes of execution in the Real Time Runtime System. Program Block 1 (821) comprises steps 801-804, Program Block 2 (822) comprises step 805. Program Block 3 (823) comprises steps 806-809, Program Block 4 (824) comprises step 810, and Program Block 5 (825) comprises steps 811 and 812.

Parallel Stream Cluster

A second specific embodiment of the invention is as a distributed parallel stream cluster (PSC) which comprises a group of parallel stream processing systems (i.e., two or more PSPS systems or nodes) connected by a network, with real-time software providing automatic fault tolerance and self-healing, resource sharing, load balancing and self-optimization, and peak performance across the cluster. A PSC architecture is vital in mission critical stream processing applications where automatic recovery is required to ensure continuous real-time availability in the presence of hardware or software failures. It also allows hardware upgrades and replacements to be carried out while the system is running, allows resource sharing within a unified architecture, and enables the architecture to provide unlimited scalability.

The present invention further comprises a PSC software architecture which provides fault tolerance and self-healing, as well as load balancing and self-optimization which addresses the requirements of organizations running mission critical parallel stream processing applications. The software architecture consists of up to four components:

1. A monitoring component for real-time monitoring of all hardware, allowing hardware problems to be anticipated and appropriate action taken. For example, when it is detected that a server may be about to have a hardware failure, the programs running on that server can be proactively "evacuated" to another server using a live migration feature. The functionality of this aspect of the monitoring component is based on Intel's standard Intelligent Platform Management Interface (IPMI). (For further description of IPMI, see e.g., "IMPI Intelligent Platform Management Interface Specification, Second Generation v2.0" (Feb. 12, 2004) available from Intel Corporation, the disclosure of which is hereby incorporated by reference). The monitoring component also collects regular heartbeat information from each of the nodes of the cluster. When several heartbeats from a given node have failed to arrive, the cluster can declare that node to have stopped functioning, and initiate the recovery procedure to restart each of the programs that had been running on that node from their last checkpoint.

2. A distributed load balancing module for parallel real-time monitoring of the load on each node of the cluster. This feature allows the current load on each node to be used as a means of intelligently load balancing the cluster to ensure peak performance. The solution provides real-time information on CPU load, disk usage, amount of free memory, and volume of network communication, in a way that is similar to that of Ganglia (for further description of Ganglia see, e.g., Matthew L Massie et al. The Ganglia Distributed Monitoring System: Design, Implementation, and Experience. Parallel Computing, Vol. 30, Issue 7 (July 2004), 817-840, the disclosure of which is hereby incorporated by reference).

3. A live migration module for automatic live migration of programs and flows from one stream processing machine (or node) to another for load balancing or proactive fault tolerance. In recent years, a number of companies have developed software technologies that allow programs to be migrated from one server to another while they are running. For instance, commercial products from VMware, Citrix and Virtual Iron all offer this capability, as does the open source Xen product. Live migration in the parallel stream cluster can be achieved using any one of these existing technologies. Intelligent control of the live migration, to ensure continuous availability and peak performance, is achieved by continuous analysis of the data from the hardware monitoring and cluster load monitoring systems. Running programs and flows inside virtual machines in this way also has the benefit of ensuring security and performance isolation amongst the numerous programs and flows running across the cluster.

4. A global distributed file system with parallel data access for performance and data redundancy for fault tolerance and recovery. The file system is highly scalable and can handle very large numbers of files. Unlike most file systems, it is optimized for handling files that are written once and then read many times. It offers very high performance and throughput when carrying out large streaming reads from a file. In the presently preferred embodiment, the functionality of the file system is based on that of the Hadoop Distributed File System (HDFS) although other standard distributed file systems could also be used. For further description of HDFS, see e.g., Borthakur, Dhruba "The Hadoop Distributed File System: Architecture and Design" (2007) available from the Apache Software Foundation, the description of which is hereby incorporated by reference.

For checkpointing and recovery in the parallel stream cluster, the global distributed file system keeps multiple copies of streams, flow information, programs, and multiple copies of all other information on stream consumption and output, priorities, time parameters etc. required to enable efficient recovery from failure. In situations where it is important to ensure real-time continuity and full stream analysis in all circumstances, programs running on the cluster can also be run in a redundant mode, with two or more copies of the program being run concurrently. Users of the cluster can decide on the correct tradeoff between reliability and performance in such cases.

As the scale of a PSC architecture increases it is important to scale the design of the architecture "diagonally" rather than simply scaling-up or scaling-out. In the currently preferred embodiment, in allocating hardware resources to support operations of the present invention only a small fraction (for example 1%) of the total number of servers which serve as "masters" are highly stateful and highly reliable machines. The vast majority of the hardware utilized (e.g., the other 99%) can be very low-cost (less reliable) commodity machines (workers) that carry out the bulk of the work, but are not responsible for maintaining complex metadata or complex state.

Cloud Computing Service

A third specific embodiment of the parallel stream processing system of the present invention is as an online cloud computing service, where users access a version of the invention via a network such as the Internet, and pay based on their usage of the PSPS. Such an online service may also be offered as a free service supported, for example, by advertising. The Parallel Stream Cluster architecture provides a reference architecture for such an online service. Service providers can simply run the Parallel Stream Cluster software architecture on a public or a private cloud computing infrastructure with the required compute power, storage and network bandwidth.

Logical Overview

Figure 9:
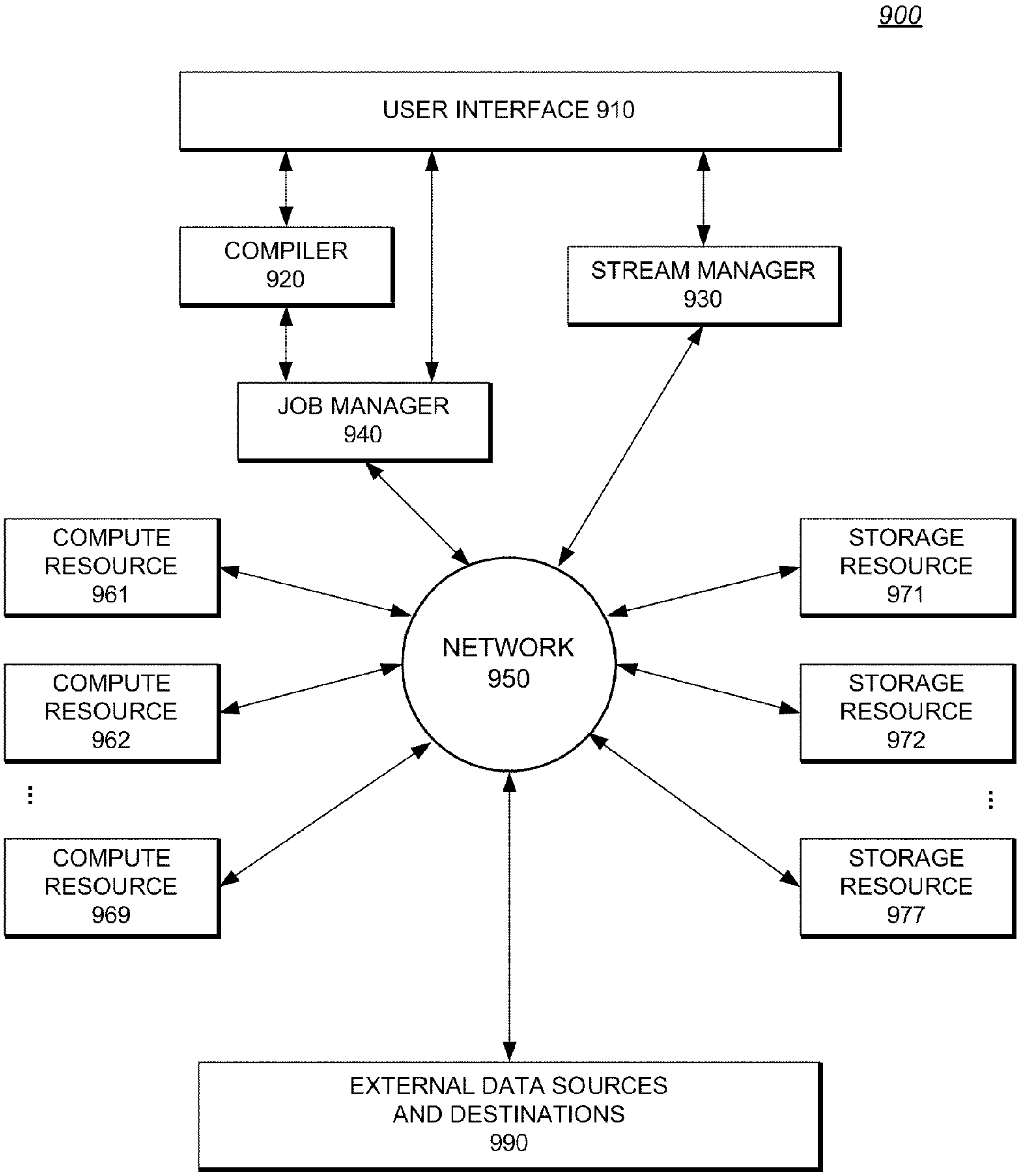
FIG. 9 provides a simplified high-level logical overview of the present invention, which can be directly related to the Parallel Stream Processing System, the Parallel Stream Cluster, and the Cloud Computing Service embodiments of the present invention.

FIG. 9 provides a simplified high level logical overview 900 of the present invention, which can be directly related to all three of the specific embodiments described above: the Parallel Stream Processing System, the Parallel Stream Cluster, and the Cloud Computing Service. The logical view is independent of any one particular physical implementation. As shown at FIG. 9, the Job Manager 940 is responsible for all aspects of the Runtime Systems. The Stream Manager 930 is responsible for all aspects of stream conversion, storage and communication. The External Data Sources and Destinations modules 990 are responsible for stream input and output. The Compiler 920 is responsible for program validation and translation to code that can be run by the Runtime Systems.

A number of Compute Resources 961, 962, . . . 969 are available for computation. The total set of Compute Resources available might be as limited as a single personal computer with two processor cores, or it could be essentially unlimited, for example, one hundred thousand quad-core servers or more. A number of Storage Resources 971, 972, . . . 977 are available for storage of data streams. The total set of Storage Resources available might be as limited as a single 80 gigabyte disk, or it could be essentially unlimited, for example, an array of storage devices with petabytes of capacity or more. A network 950 connects the Compute Resources 961-969, the Storage Resources (971-977) and other components, including the User Interface 910, Compiler 920, Stream Manager 930, Job Manager 940 and External Data Sources and Destinations 990.

The User Interface 910 can be, for example, a Rich Internet Application GUI implemented in Adobe Flex, an Excel add-in, an XML-based Application Programming Interface, or a simple command line interface. The Compiler 920, Stream Manager 930 and Job Manager 940 can be controlled, for example, from a GUI or from an Excel add-in.

If run as a Cloud Computing Service, the present invention can, for example, be used in a mode where the User Interface 910 provides local support for program development and program validation by users on their desktop or in their Internet browser, while remote cloud computing resources and cloud storage resources are used for the Runtime Systems, the FIFO Store and the Persistent Store.

External Data Sources and Destinations 990 can be local or remote. Input data can, for example, be from a local computer or from a remote location available on the Internet. Output data can, for example, be supplied to a local or remote Excel spreadsheet, supplied as an alert to a mobile phone, supplied to other stream processing applications, or supplied to other types of applications or services.

Multilevel Parallelism

In a system constructed in accordance with the present invention there are opportunities for parallel processing at up to eight distinct levels. Only three of these levels require explicit definitions, the other five are implicit and can be exploited automatically by the system. The eight levels are as follows:

1. Algorithmic Parallelism. Implicit. Each of the Assignment Block primitives in the library not only has a fast sequential algorithm (low polynomial complexity), but can also be realized using very fast, highly parallel algorithms. For example, one can implement an Assignment Block primitive that computes directed path information on a window which contains one million rows in a way that exploits the algorithmic parallelism in the directed path primitive to significantly speed up its computation on either a shared memory or a distributed memory architecture.

The computational problems at the core of the various Assignment Blocks discussed above include string matching, prefix sums, sorting and selection, computing histograms, graph connectivity and shortest paths. Each of these has a number of well-known highly parallel algorithms that can be efficiently realized using Threading Building Blocks (for further description of Thread Building Blocks see, e.g., James Reinders "Intel Threading Building Blocks" O'Reilly (2007), the disclosure of which is hereby incorporated by reference), data parallel programming environments such as Ct, or any other parallel language or library.

2. Column Parallelism. Implicit. An Assignment Block in a ColumnFlow program sets all the values in a specific column of the stream, and in many cases can be applied to all the rows of the stream, or all the rows in a Window, in parallel. For example, an Assignment Block which sets the values in column A to be the sum of the values in columns B and C is fully parallel and that parallelism can be exploited by the system implementation.

3. Pipeline Parallelism. Implicit. In many cases, two or more blocks in a ColumnFlow pipeline may be computed in parallel. For example, an Assignment Block in which column D is assigned the value of the sum of columns A and B can be computed in parallel with an assignment in which column E is assigned the value of the minimum of columns B and C.

4. Parallel-Merge Parallelism. Explicit. Parallel sections provide an explicit mechanism for defining both static and dynamic parallel computations on streams. The construct can be used to easily build complex, powerful and massively parallel stream processing applications. For example, simply by combining a Parallel section with a directed or undirected path Assignment Block in a ColumnFlow program it is possible to carry out parallel exploration of a streaming knowledge base of RDF data in a semantic web application.

5. Window Parallelism Explicit. Window sections provide a very powerful means of easily defining partitions of an infinite data stream into a disjoint set of contiguous finite intervals, and then applying powerful functional primitives in parallel to that set of intervals.

6. Parametric Parallelism. Explicit. A ColumnFlow program may be defined to have a static form of parametric parallelism, by giving a set of parameters and constraints (Boolean expressions) on those parameters. The result will be a replicated collection of ColumnFlow programs, where the replication is based on the set of valid combinations of parameters. For example, a parametric ColumnFlow program may be designed with two parameters a and b, where a is defined to take the set of values 4, 6, 8 and b is defined to take the set of values 3, 6, 9 and where there is a constraint that a and b must be distinct. The effect is to create eight separate ColumnFlow programs where the parameters (a, b) are instantiated as (4,3), (4,6), (4,9), (6,3), (6,9), (8,3), (8,6) and (8,9). Each of the eight programs generates a separate output stream.

7. IntraFlow Parallelism. Implicit. Each ColumnFlow program is run on a flow derived from an SCF stream. Two or more flows may be extracted from a single SCF stream, for example, by choosing different subsets of the columns in the SCF stream. For each flow, the set of ColumnFlow programs that are running on it at any particular time can be executed in parallel. Since, in the currently preferred embodiment of the present invention, index column construction is separate from program execution, they can also share certain aspects of the stream processing such as the index construction.

8. InterFlow Parallelism. Implicit. The execution of programs on two distinct flows can be carried out in parallel.

Block Primitives and Library Functions

In its currently preferred embodiment, the present invention includes a set of library functions available as a software system implemented using the C++ program language. This set of library functions includes block primitives for general expressions involving arithmetic, Boolean and relational operators, and for a large number of functions. The following illustrate some of the library functions provide in the currently preferred embodiment of the present invention.

The library includes the following classes and typedefs for the various types—time, duration, string, tribool, pair, array, integer, real, Boolean:

```
1: Classes
2:
3: class    pinpoint::simple_language::time
4:    The standard timestamp type.
5:
6: class    pinpoint::simple_language::duration
7:    The standard time difference type.
8:
9: class    pinpoint::simple_language::string
10:    The standard string type.
11:
12: class    pinpoint::simple_language::tribool
13:    A boolean type which can also be undetermined.
14:
15: class    pinpoint::simple_language::pair< T, U >
16:    A pair.
17:
18: class    pinpoint::simple_language::array< T, N >
19:    A fixed size array.
20:
21:
22: Typedefs
23:
24: typedef int    pinpoint::simple_language::integer
25:    The standard integer type.
26:
27: typedef double    pinpoint::simple_language::real
28:    The standard floating point type.
29:
30: typedef bool    pinpoint::simple_language::boolean
31:    The standard boolean type.
```

The following illustrates the classes provided for the main data structures, columns and windows.

```
1: Classes
2:
3: class    pinpoint::simple_language::Column< T >
4:    Represents a column in the stream of type T.
5:
6: class    pinpoint::simple_language::ErrorColumn
7:    Represents the error column.
8:
9: class    pinpoint::simple_language::Window
10:    Represents a windowing system on the stream.
```

The following illustrates enumerations and variables for constants provided in the presently preferred embodiment. A tribool can be true, false or indeterminate.

```
1: Enumerations
2:
3: enum    pinpoint::simple_language::IO {
pinpoint::simple_language::None, pinpoint::simple_language::Input,
pinpoint::simple_language::Output,
pinpoint::simple_language::InputAndOutput }
```

-continued

```
4:       IO modes for Columns.
5:
6: Variables
7:
8: static const tribool    pinpoint::simple_language::null
9: Neither true or false: indeterminate.
10:
```

The library also provides several data parallel primitive functions that provide the pipeline structure—parallel, merge, window, select—as follows:

```
1: Functions
2:
3: template<class T>
4: void    pinpoint::simple_language::parallel
5:  (const Column< T > &x, integer maxSize)
6:    Dynamic parallel separates the stream in as many sub-streams as
there are unique values in the provided column.
7:
8: template<class T, size_t N>
9: void    pinpoint::simple_language::parallel
10:  (const Column< T > &x, const array< T, N > &xs)
11:    Static parallel separates the stream in a fixed number of
sub-streams.
12:
13: void    pinpoint::simple_language::parallel (Window &window)
14:    Window parallel divides the stream into windows.
15:
16: void    pinpoint::simple_language::merge ( )
17:    Merges a parallellized stream.
18:
19: void    pinpoint::simple_language::select
20:  (const Column< boolean > &column)
21: Select only the rows for which the Boolean column is true.
```

Array functions provided by the library include functions that find a subarray, find a value, insert, remove or set a value as illustrated by the following:

```
1: Functions
2:
3: template<class T, size_t N, size_t M>
4: Column< integer >
pinpoint::simple_language::array_find_first_subarray
5:  (const Column< array< T, N > > &x, const
   Column< array< T, M > > &y)
6:
7: template<class T, size_t N, size_t M>
8: Column< integer >
pinpoint::simple_language::array_find_last_subarray
9:  (const Column< array< T, N > > &x, const
   Column< array< T, M > > &y)
10:
11: template<class T, size_t N>
12: Column< integer >    pinpoint::simple_language::array_find_value
13:  (const Column< array< T, N > > &x, const Column< T > &y)
14:
15: template<class T, size_t N>
16: Column< T >    pinpoint::simple_language::array_return_first_value
17:  (const Column< array< T, N > > &x)
18:
19: template<class T, size_t N>
20: Column< T >    pinpoint::simple_language::array_return_last_value
21:  (const Column< array< T, N > > &x)
22:
23: template<class T, size_t N>
24: Column< array< T, N+1 > >
pinpoint::simple_language::array_insert_value_at
25:  (const Column< array< T, N > > &a, const Column< T > &x, const
Column< integer > &i)
26:
```

-continued

```
template<class T, size_t N>
Column< array< T, N > > pinpoint::simple_language::array_set_value_at
 (const Column< array< T, N > > &a, const Column< T > &x, const Column< integer > &i)

template<class T, size_t N>
Column< array< T, N−1 > > pinpoint::simple_language::array_remove_value_at
 (const Column< array< T, N > > &a, const Column< integer > &i)

template<class T, size_t N>
Column< T > pinpoint::simple_language::array_return_value_at
 (const Column< array< T, N > > &a, const Column< integer > &i)

template<class T, size_t N>
Column< array< T, N+1 > > pinpoint::simple_language::array_insert_value_first
 (const Column< array< T, N > > &a, const Column< T > &x)

template<class T, size_t N>
Column< array< T, N+1 > > pinpoint::simple_language::array_insert_value_last
 (const Column< array< T, N > > &a, const Column< T > &x)

template<class T, size_t N>
Column< array< T, N+1 > > pinpoint::simple_language::array_insert_value_sorted
 (const Column< array< T, N > > &a, const Column< T > &x)

template<class T, size_t N>
Column< array< T, N−1 > > pinpoint::simple_language::array_remove_first_value
 (const Column< array< T, N > > &a)

template<class T, size_t N>
Column< array< T, N−1 > > pinpoint::simple_language::array_remove_last_value
 (const Column< array< T, N > > &a)

template<class T, size_t N>
Column< integer > pinpoint::simple_language::array_return_size
 (const Column< array< T, N > > &a)
```

Tuple functions are also included that combine, or zip, two columns together to form a column of pairs, and functions that extract the first and second columns from a pair as illustrated in the following:

```
Functions

template<class T, class U>
Column< T > pinpoint::simple_language::first_of_pair
 (const Column< pair< T, U > > &x)

template<class T, class U>
Column< T > pinpoint::simple_language::second_of_pair
 (const Column< pair< T, U > > &x)

template<class T, class U>
Column< pair< T, U > > pinpoint::simple_language::zip
 (const Column< T > &x, const Column< U > &y)
```

The following describes prefix functions currently provided in the library. Prefix functions apply a function to each prefix of a stream sequence. The function can be of many forms, e.g., arithmetic (sum, product), logical (and, or), comparison (maximum, minimum) or other kinds of functions.

```
Functions

Column< boolean > pinpoint::simple_language::prefix_and
 (const Column< boolean > &x)

Column< boolean > pinpoint::simple_language::prefix_or
 (const Column< boolean > &x)

template<class T>
Column< T > pinpoint::simple_language::prefix_product
 (const Column< T > &x)

template<class T>
Column< T > pinpoint::simple_language::prefix_sum
 (const Column< T > &x)

template<class T>
Column< T > pinpoint::simple_language::prefix_maximum
 (const Column< T > &x)

template<class T>
Column< T > pinpoint::simple_language::prefix_minimum
 (const Column< T > &x)
```

Type conversion functions currently provided include the following:

```
Functions

template<class T>
Column< string > pinpoint::simple_language::convert_to_string
 (const Column< T > &x)

Column< integer > pinpoint::simple_language::convert_to_integer
 (const Column< string > &x)

Column< integer > pinpoint::simple_language::convert_to_integer
 (const Column< real > &x)

Column< integer > pinpoint::simple_language::convert_to_integer
 (const Column< boolean > &x)

Column< integer > pinpoint::simple_language::convert_to_integer
 (const Column< duration > &x)

Column< real > pinpoint::simple_language::convert_to_real
 (const Column< string > &)

Column< real > pinpoint::simple_language::convert_to_real
 (const Column< integer > &x)

Column< boolean >
 pinpoint::simple_language::convert_to_boolean
 (const Column< string > &x)

Column< boolean >
 pinpoint::simple_language::convert_to_boolean
 (const Column< integer > &x)

Column< tribool > pinpoint::simple_language::convert_to_tribool
 (const Column< string > &)

Column< tribool > pinpoint::simple_language::convert_to_tribool
 (const Column< boolean > &x)

Column< time > pinpoint::simple_language::convert_to_time
 (const Column< string > &x)

```

```
40: Column< duration >
    pinpoint::simple_language::convert_to_duration
41: (const Column< string > &x)
42:
43: Column< duration >
    pinpoint::simple_language::convert_to_duration
44: (const Column< integer > &x)
```

The library also includes many standard mathematical functions including the following:

```
 1: Functions
 2:
 3: Column< real >   pinpoint::simple_language::math_abs
 4: (const Column< real > &x)
 5:
 6: Column< real >   pinpoint::simple_language::math_acos
 7: (const Column< real > &x)
 8:
 9: Column< real >   pinpoint::simple_language::math_asin
10: (const Column< real > &x)
11:
12: Column< real >   pinpoint::simple_language::math_atan
13: (const Column< real > &x)
14:
15: Column< real >   pinpoint::simple_language::math_ceiling
16: (const Column< real > &x)
17:
18: Column< real >   pinpoint::simple_language::math_cos
19: (const Column< real > &x)
20:
21: Column< real >   pinpoint::simple_language::math_cosh
22: (const Column< real > &x)
23:
24: Column< real >   pinpoint::simple_language::math_exp
25: (const Column< real > &x)
26:
27: Column< real >   pinpoint::simple_language::math_floor
28: (const Column< real > &x)
29:
30: Column< real >   pinpoint::simple_language::math_log_10
31: (const Column< real > &x)
32:
33: Column< real >   pinpoint::simple_language::math_log_e
34: (const Column< real > &x)
35:
36: Column< real >   pinpoint::simple_language::math_power
37: (const Column< real > &x, const Column< real > &y)
38:
39: Column< integer >   pinpoint::simple_language::math_power
40: (const Column< integer > &x, const Column< integer > &y)
41:
42: Column< real >   pinpoint::simple_language::math_remainder
43: (const Column< real > &x, const Column< real > &y)
44:
45: Column< integer >   pinpoint::simple_language::math_mod
46: (const Column< integer > &x, const Column< integer > &y)
47:
48: Column< real >   pinpoint::simple_language::math_round
49: (const Column< real > &x)
50:
51: Column< real >   pinpoint::simple_language::math_sin
52: (const Column< real > &x)
53:
54: Column< real >   pinpoint::simple_language::math_sinh
55: (const Column< real > &x)
56:
57: Column< real >   pinpoint::simple_language::math_sqrt
58: (const Column< real > &x)
59:
60: Column< real >   pinpoint::simple_language::math_tan
61: (const Column< real > &x)
62:
63: Column< real >   pinpoint::simple_language::math_tanh
64: (const Column< real > &x)
```

Random number and sampling functions that are provided include functions to mark a fraction of the rows, e.g., one-third of the rows, to generate uniform random numbers and to generate normally distributed random numbers as follows:

```
 1: Functions
 2:
 3: Column< boolean >
pinpoint::simple_language::random_mark_fraction_of_rows (double fraction)
 4:
 5: Column< real >
pinpoint::simple_language::random_number_normal ( )
 6:
 7: Column< real >
pinpoint::simple_language::random_number_uniform_0_to_1 ( )
 8:
 9: Column< real >
10:      pinpoint::simple_language::random_number_uniform_from_to
11: (real a, real b)
```

The library also currently includes a number of string processing functions, including functions that append one string to another, find and return characters and substrings, insert a new substring, remove and replace characters, return length of a string. There are also functions that perform regular expression pattern matching, and a function that returns the Lucene score for a given Lucene query.

```
 1: Functions
 2:
 3: Column< string >   pinpoint::simple_language::string_append
 4: (const Column< string > &str, const Column< string > &b)
 5:
 6: Column< string >
pinpoint::simple_language::string_return_char_at
 7: (const Column< string > &str, const Column< integer > &index)
 8:
 9: Column< string >
pinpoint::simple_language::string_return_first_char
10: (const Column< string > &str)
11:
12: Column< string >
pinpoint::simple_language::string_return_last_char
13: (const Column< string > &str)
14:
15: Column< integer >
pinpoint::simple_language::string_find_first_in_charset
16: (const Column< string > &str, const Column< string > &charset)
17:
18: Column< integer >
pinpoint::simple_language::string_find_first_not_in_charset
19: (const Column< string > &str, const Column< string > &charset)
20:
21: Column< integer >
pinpoint::simple_language::string_find_first_substring
22: (const Column< string > &str, const Column< string > &substr)
23:
24: Column< integer >
pinpoint::simple_language::string_find_last_in_charset
25: (const Column< string > &str, const Column< string > &substr)
26:
27: Column< integer >
pinpoint::simple_language::string_find_last_not_in_charset
28: (const Column< string > &str, const Column< string > &charset)
29:
30: Column< integer >
pinpoint::simple_language::string_find_last_substring
31: (const Column< string > &str, const Column< string > &substr)
32:
33: Column< string >
pinpoint::simple_language::string_insert_string_at
34: (const Column< string > &str, const Column< string > &other, const Column< integer > &index)
```

```
35:
36: Column< string >
pinpoint::simple_language::string_keep_chars_from_to
37: (const Column< string > &str, const Column< integer > &a, const
Column< integer > &b)
38:
39: Column< boolean >
pinpoint::simple_language::string_mark_if_empty
40: (const Column< string > &str)
41:
42: Column< boolean >
pinpoint::simple_language::string_mark_if_regex_matches (const
Column< string > &str, const string ®ex)
43:
44: Column< string >
pinpoint::simple_language::string_remove_chars_from_to
45: (const Column< string > &str, const Column< integer > &a, const
Column< integer > &b)
46:
47: Column< string >
pinpoint::simple_language::string_replace_string_from_to
48: (const Column< string > &str, const Column< string > &other, const
Column< integer > &a, const Column< integer > &b)
49:
50: Column< string >
pinpoint::simple_language::string_replace_string_regex
51: (const Column< string > &str, const string &find, const string
&replace)
52:
53: Column< string >   pinpoint::simple_language::string_resize
54: (const Column< string > &str, const Column< integer > &newSize,
const Column< string > &fillChar)
55:
56: Column< real >
pinpoint::simple_language::string_score_lucene_query
57: (const Column< string > &str, const string &query)
58:
59: Column< integer >   pinpoint::simple_language::string_return_size
60: (const Column< string > &str)
```

Time functions provided in the library include a functions that returns a timestamp and various functions that extract the individual integer components of a time (e.g., year, month, day, hour, minute, second) as follows:

```
1: Functions
2:
3: Column< time >   pinpoint::simple_language::timestamp ( )
4:
5: Column< integer >   pinpoint::simple_language::time_day
6: (const Column< time > &)
7:
8: Column< integer >   pinpoint::simple_language::time_hour
9: (const Column< time > &)
10:
11: Column< integer >   pinpoint::simple_language::time_minute
12: (const Column< time > &)
13:
14: Column< integer >   pinpoint::simple_language::time_month
15: (const Column< time > &)
16:
17: Column< integer >   pinpoint::simple_language::time_second
18: (const Column< time > &)
19:
20: Column< integer >   pinpoint::simple_language::time_year
21: (const Column< time > &)
```

An important feature of the ColumnFlow model of the present invention is the extensive and open-ended library of functions on finite window intervals of streams. The window functions include primitives for a wide variety of critical stream processing tasks, including: counting the unique values in a window; determining the first value, last value, maximum value, minimum value in a window; determining window length; determining the sum of values, product of values, logical and of values, logical or of values in a window; determining the frequency of values, rank of values, bottom K values, top K values in a window; determining the start of window, end of window; marking K random rows in a window; marking a longest increasing or a longest decreasing subsequence in a window; marking the set of unique values in a window; computing the reverse of a window sequence; computing undirected or directed shortest paths connecting nodes; and sorting a window sequence. It should be noted that in the case of all these window functions, they are only used in the context of a window section within a pipeline that partitions the stream into contiguous intervals.

```
1: Functions
2:
3: template<class T>
4: Column< integer >
pinpoint::simple_language::window_count_unique_values
5: (const Column< T > &x)
6:
7: template<class T>
8: Column< T >
pinpoint::simple_language::window_fill_first_value
9: (const Column< T > &x)
10:
11: template<class T>
12: Column< T >   pinpoint::simple_language::window_fill_last_value
13: (const Column< T > &x)
14:
15: Column< integer >
pinpoint::simple_language::window_fill_length ( )
16:
17: template<class T>
18: Column< T >
pinpoint::simple_language::window_fill_maximum_value
19: (const Column< T > &x)
20:
21: template<class T>
22: Column< T >
pinpoint::simple_language::window_fill_minimum_value
23: (const Column< T > &x)
24:
25: template<class T>
26: Column< T >
pinpoint::simple_language::window_fill_product_of_values
27: (const Column< T > &x)
28:
29: template<class T>
30: Column< T >
pinpoint::simple_language::window_fill_sum_of_values
31: (const Column< T > &x)
32:
33: template<class T>
34: Column< integer >
pinpoint::simple_language::window_return_frequency_of_values
35: (const Column< T > &x)
36:
37: template<class T>
38: Column< boolean >
pinpoint::simple_language::window_mark_bottom_k_values
(const Column< T > &x, integer k)
39:
40: template<class T>
41: Column< boolean >
pinpoint::simple_language::window_mark_bottom_k_values_unique
42: (const Column< T > &x, integer k)
43:
44: Column< boolean >
pinpoint::simple_language::window_mark_end ( )
45:
46: Column< boolean >
pinpoint::simple_language::window_mark_start ( )
47:
48: Column< boolean >
pinpoint::simple_language::window_mark_if_all_true
```

-continued

```
49: (const Column< boolean > &)
50:
51: Column< boolean >
pinpoint::simple_language::window_mark_if_any_true
52: (const Column< boolean > &)
53:
54: Column< boolean >
pinpoint::simple_language::window_mark_k_random_rows (integer)
55:
56: template<class T>
57: Column< boolean >
pinpoint::simple_language::window_mark_longest_decreasing
58: (const Column< T > &x)
59:
60: template<class T>
61: Column< boolean >
pinpoint::simple_language::window_mark_longest_increasing (const
Column< T > &x)
62:
63: template<class T>
64: Column< boolean
>pinpoint::simple_language::window_mark_longest_strictly_decreasing
65: (const Column< T > &x)
66:
67: template<class T>
68: Column< boolean >
pinpoint::simple_language::window_mark_longest_strictly_increasing
(const Column< T > &x)
69:
70: template<class T>
71: Column< boolean >
pinpoint::simple_language::window_mark_top_k_values
72: (const Column< T > &x, integer k)
73:
74: template<class T>
75: Column< boolean >
pinpoint::simple_language::window_mark_top_k_values_unique
76: (const Column< T > &x, integer k)
77:
78: template<class T>
79: Column< boolean >
pinpoint::simple_language::window_mark_unique_values
80: (const Column< T > &x)
81:
82: template<class T>
83: Column< integer >
pinpoint::simple_language::window_return_rank_of_values
84: (const Column< T > &x)
85:
86: template<class T>
87: Column< integer >
pinpoint::simple_language::window_return_rank_of_values_unique
(const Column< T > &x)
88:
89: template<class T>
90: Column< T >    pinpoint::simple_language::window_reverse
91: (const Column< T > &x)
92:
93: template<class T>
94: Column< integer >
pinpoint::simple_language::window_shortest_paths_directed_from
(const Column< T > &from, const Column< T > &to, const T &start)
95:
96: template<class T>
97: Column< integer >
pinpoint::simple_language::window_shortest_paths_undirected_from
(const Column< T > &from, const Column< T > &to, const T &start)
98:
99: template<class T>
100: Column< T >   pinpoint::simple_language::window_sort_down
101: (const Column< T > &x)
102:
103: template<class T>
104: Column< T >   pinpoint::simple_language::window_sort_up
105: (const Column< T > &x)
```

Alternative Embodiments

It is understood that the systems and methods described herein can be implemented in hardware, software, or a combination of hardware and software. In the above discussion, several examples are provided of components of a specific embodiment of the invention as a computer program written in the programming language C++; however, those skilled in the art will understand that the present invention can be realized in any programming language or combination of languages, as desired.

The foregoing discussion of the currently preferred embodiment also uses an example of a parallel computing system in which the stream processing programs are constructed using a graphical user interface. However, it should be recognized that the present invention can also be realized in a form where the stream processing programs are constructed using a standard programming language such as Java, C++, Haskell or C for example, or using a domain-specific language embedded in such a programming language. Even in the case where the program is constructed using a GUI, it should be understood that the internal form does not need to be represented in XML format as illustrated in some the above examples. Additionally, although the above example describes converting from XML to C++ as a target language, those skilled in the art will appreciate that other internal forms and programming languages may also be used if desired. For example, the internal form could be JSON and the target language Java. Additionally, the present invention can be implemented on a single sequential computer, on a single shared memory multiprocessor, or on a cluster of computers containing some mixture of sequential and shared memory multiprocessors. Additionally, the invention can be realized with or without clustering for high availability.

The embodiment of the invention as a parallel stream cluster described herein, assumes the cluster architecture to be a fully distributed "shared nothing" architecture. However, the present invention can alternatively be realized in the form of a shared disk cluster, as a cluster with network-attached storage, as a cluster with a storage area network, and in a variety of other forms.

The invention is described here in terms of its implementation on sequential, parallel and clustered computer systems based on general purpose microprocessor hardware such as the x86 chip architectures of Intel and AMD. The invention can also be realized using more specialized, highly parallel General Purpose Graphics Processing Units (GPGPUs) such as the IBM Cell, Clearspeed, NVIDIA GeForce, Intel Larrabee (forthcoming) or AMD FireStream. Realizing the invention on GPGPU architectures can be done using any one of the available GPGPU parallel programming languages and APIs such as Intel Ct, NVIDIA CUDA or the AMD FireStream SDK.

The multilevel parallelism of the invention makes the parallel random-access machine (PRAM) model described, for example, by Joseph JaJa (e.g., in "An Introduction to Parallel Algorithms", Addison-Wesley (1992), the disclosure of which is hereby incorporated by reference) also a very appropriate target for implementation. The PRAM may emerge as a practical parallel computing architecture in the coming years. If so, the present invention will be well placed to take advantage of PRAM-based systems.

The invention can be realized with an alternative standardized format for streams, or with no standardized format. For example, it can be realized in a form where fragments of structured hierarchical data in formats such as XML or JSON are permitted within stream cells, rather than treating those as text. The range of formats for streaming data that can be processed by the invention is open and unlimited and may include tables (CSV, TSV, relations), text (plain text in English and other languages, RTF, HTML, XHTML, XML, JSON, OPML, email, audio transcripts), feeds (RSS, Atom, GeoRSS, GML, GData), graphs (RDF), other formats (JMS, TIBCO Rendezvous, Wombat, MQ Series, EPC-RFID, Sonic ESB, EDI, FIX, Reuters) and many others. As new standards emerge, such as the RFID Application Level Event Standard, the range of formats that can be used with the invention will continue to grow.

The invention can incorporate a number of different kinds of indexing methods and query languages for use in the Assignment Block for scoring a static or dynamic query against an index column using information retrieval methods. For example, each of the following sixteen queries are examples of queries that can be used in a string_score_lucene_query Assignment Block:

```
1: cairo
2: city
3: "stream intelligence"~5
4: cairo egypt
5: +tiger -woods
6: colo?r
7: program*
8: massachusetts~0.8
9: pinpoint   "cloudscale studio"^4.2
10: john paul george ringo^3
11: stock:{AAAA TO DZZZ}
12: price:{3800 TO max_price}
13: cutoff:{0.2 TO threshold}
14: category   company^boost_value   Google   IBM
15: lastmodified:{12:00 TO time}
16: span(10,[boeing, government, contract])
```

The above examples of queries that can be used in a string_score_lucene_query Assignment Block are based on the open source Lucene index and searching software. (For further description of Lucene indexes and searching software, see, e.g., Otis Gospodnetic and Erik Hatcher "Lucene in Action", Manning Publications (2005), the disclosure of which is hereby incorporated by reference.)

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention. For instance and without limitation of the foregoing, the present invention can be implemented as a system of hardware and software offered commercially as a product for purchase, or may be offered for use as an online cloud computing service. The invention can also be directly embedded in a computer program or system, such as a spreadsheet, in order to carry out the methods and functions of the invention for that program or system.

What is claimed is:

1. A system for parallel analytical processing of data streams, the system comprising:

a converter that receives input streams of data in a plurality of formats including input data streams in table, text, feed and graph formats and transforms said streams in table, text, feed and graph formats into a standardized data stream format comprising rows and columns in which values in a given column are of a homogeneous type;

a storage system that continuously maintains a finite interval of each stream in the standardized data stream format subject to specified space limits for the stream;

a graphical user interface comprising an add-in to a spreadsheet application enabling a user to visually construct parallel analytical programs for analytical processing of streams in the standardized data stream format within the spreadsheet application using graphical building blocks, wherein a parallel analytical program comprises a linear sequence of program building blocks for performing operations on a data stream in parallel, wherein each stream of data is represented in the graphical user interface in a two-dimensional cell-based format, wherein the graphical user interface performs continuous static dependency and type checking during construction of parallel analytical programs; and a runtime computing system comprising a cluster of distributed parallel processing computing nodes connected by a network running multiple parallel analytical programs continuously on the streams in the standardized data stream format as they flow through the storage system, wherein the runtime computing system operates concurrently with the converter and storage system to perform tasks of converting multiple source data streams into the standardized data stream format, maintaining an interval of multiple data streams and running multiple parallel analytical programs on multiple data streams.

2. The system of claim 1, wherein said input streams of data comprise live data streams that are processed by the system in real-time.

3. The system of claim 1, wherein said standardized data stream format comprises a two-dimensional cell-based data format.

4. The system of claim 1, further comprising:

a timestamp module for applying a timestamp to each row of data in a stream in the standardized data stream format.

5. The system of claim 1, wherein said program building blocks comprise selected ones of assignment, selection, parallel and window program building blocks.

6. The system of claim 1, wherein said parallel analytical programs are constructed without requiring additional non-linear control flow.

7. The system of claim 1, wherein said interface comprises an open application programming interface in which a parallel analytical program is represented as a linear sequence of Extended Markup Language (XML) building blocks.

8. The system of claim 1, wherein output from said parallel analytical program is input directly into a spreadsheet.

9. The system of claim 1, wherein the storage system comprises a distributed file system providing each node of the cluster with access to data streams.

10. The system of claim 1, wherein the runtime computing system further comprises:

a real-time software module providing resource sharing, load balancing, and fault tolerance amongst nodes of the cluster.

11. The system of claim 10, wherein said real-time software module comprises:

a monitoring module for real-time monitoring of cluster hardware; and a distributed load balancing module for monitoring and balancing load at each node of the cluster.

12. The system of claim 11, wherein said real-time software module further comprises:

a resource module for automatic migration of parallel analytical programs from one node of the cluster to another node for fault tolerance.

13. The system of claim 1, wherein the system comprises an online cloud computing service providing parallel analytical processing services to users connected via a network.

* * * * *